US007252592B2

(12) United States Patent
Rodgers et al.

(10) Patent No.: US 7,252,592 B2
(45) **Date of Patent: *Aug. 7, 2007**

(54) GAMING DEVICE HAVING SYMBOLS WITH TRANSFORMATION PROBABILITIES

(75) Inventors: Paulina Rodgers, Reno, NV (US); Joseph E. Kaminkow, Reno, NV (US); Shawn Van Asdale, Reno, NV (US)

(73) Assignee: IGT, Reno, NV (US)

( * ) Notice: Subject to any disclaimer, the term of this patent is extended or adjusted under 35 U.S.C. 154(b) by 13 days.

This patent is subject to a terminal disclaimer.

(21) Appl. No.: 11/337,317

(22) Filed: Jan. 23, 2006

(65) Prior Publication Data

US 2006/0121974 A1 Jun. 8, 2006

Related U.S. Application Data

(63) Continuation of application No. 11/086,198, filed on Mar. 22, 2005, now Pat. No. 6,997,808, which is a continuation of application No. 10/255,880, filed on Sep. 26, 2002, now Pat. No. 6,921,335.

(60) Provisional application No. 60/325,976, filed on Sep. 28, 2001.

(51) Int. Cl.
*A63F 13/00* (2006.01)

(52) U.S. Cl. ........................ 463/30; 463/16; 273/138.1

(58) Field of Classification Search ............ 463/12–13, 463/16–20, 30–31; 273/138.1, 143 R, 459–460
See application file for complete search history.

(56) References Cited

U.S. PATENT DOCUMENTS 5,308,065 A 5/1994 Bridgeman et al.
5,332,228 A 7/1994 Schultz
5,423,539 A 6/1995 Nagao
5,431,408 A 7/1995 Adams
5,449,173 A 9/1995 Thomas et al.
5,704,835 A 1/1998 Dietz, II
5,823,873 A 10/1998 Moody
5,931,467 A 8/1999 Kamille
6,033,307 A 3/2000 Vancura (Continued)

FOREIGN PATENT DOCUMENTS

AU 199717601 B2 9/1997

(Continued)

OTHER PUBLICATIONS

Bally's Cash Encounters found at http://www.ballygaming.com/gameroom/video/cash-encounters.asp,visited on Dec. 17, 2001.

(Continued)

*Primary Examiner*—Scott Jones
(74) *Attorney, Agent, or Firm*—Bell, Boyd & Lloyd LLP

(57) ABSTRACT

A gaming device which includes symbols having a transformation probability. The gaming device in one embodiment includes an activator symbol. When the activator symbol is displayed, a processor of the gaming device determines the transformation probability of each of the displayed symbols and randomly determines which, if any, symbols are to be transformed into wild symbols or other functional symbols based on the transformation probability of the symbols.

89 Claims, 19 Drawing Sheets

U.S. PATENT DOCUMENTS

| | | | |
|---|---|---|---|
| 6,050,895 A | 4/2000 | Luciano et al. | |
| 6,059,658 A | 5/2000 | Mangano et al. | |
| 6,089,977 A | 7/2000 | Bennett | |
| 6,102,798 A | 8/2000 | Bennett | |
| 6,120,031 A | 9/2000 | Adams | |
| 6,142,873 A | 11/2000 | Weiss et al. | |
| 6,159,095 A | 12/2000 | Frohm et al. | |
| 6,190,254 B1 | 2/2001 | Bennett | |
| 6,220,959 B1 | 4/2001 | Holmes, Jr. et al. | |
| 6,251,013 B1 | 6/2001 | Bennett | |
| 6,290,600 B1 | 9/2001 | Glasson | |
| 6,299,165 B1 | 10/2001 | Nagano | |
| 6,299,170 B1 | 10/2001 | Yoseloff | |
| 6,302,398 B1 | 10/2001 | Vecchio | |
| 6,309,300 B1 | 10/2001 | Glavich | |
| 6,311,976 B1 | 11/2001 | Yoseloff et al. | |
| 6,322,078 B1 | 11/2001 | Adams | |
| 6,358,144 B1 | 3/2002 | Kaddlic et al. | |
| 6,419,579 B1 | 7/2002 | Bennett | |
| 6,439,993 B1 | 8/2002 | O'Halloran | |
| 6,454,266 B1 | 9/2002 | Breeding et al. | |
| 6,494,454 B2 | 12/2002 | Adams | |
| 6,517,432 B1 | 2/2003 | Jaffe | |
| 6,551,187 B1 | 4/2003 | Jaffe | |
| 6,604,740 B1 | 8/2003 | Singer et al. | |
| 6,682,073 B2 | 1/2004 | Bryant et al. | |
| 6,786,818 B1 | 9/2004 | Rothschild et al. | |
| 2002/0016200 A1 | 2/2002 | Baerlocher et al. | |
| 2002/0052233 A1 | 5/2002 | Gauselmann | |
| 2002/0068623 A1* | 6/2002 | Gauselmann | 463/20 |
| 2003/0064802 A1 | 4/2003 | Rodgers et al. | |

FOREIGN PATENT DOCUMENTS

| | | |
|---|---|---|
| AU | 199747657 B2 | 6/1998 |
| AU | 199917318 A1 | 9/1999 |
| CA | 2341927 A | 9/2001 |
| EP | 0 060 019 | 9/1982 |
| EP | 0 984 408 A2 | 3/2000 |
| EP | 1150261 A | 10/2001 |
| GB | 2 101 380 | 1/1983 |
| GB | 2 144 644 | 3/1985 |
| WO | WO 97/32285 | 9/1997 |
| WO | WO 00/32286 | 6/2000 |
| WO | WO 00/66235 | 11/2000 |
| WO | WO 00/76606 A1 | 12/2000 |
| WO | WO 03/030116 | 4/2003 |

OTHER PUBLICATIONS

Black Swan Paytable Display written by IGT, published prior to 2001.

Boot Scootin Article written by Strictly Slots/Aristocrat Leisure Industries, PTY Ltd., published prior to Jan. 2005.

Break the Spell Article written by Strictly Slots/Atronic Casino Technology, Ltd., published in Sep. 2000.

Break the Spell Brochure, published in 1999.

Atronic Description of the break the Spell as found at: http://www.atronic.com/products/videoslots/reakthespell/content.shtml, visited on Jan. 15, 2001.

Cash Chameleon Article written by Strictly Slots/Aristocrat Leisure Industries, PTY Ltd., published in Apr. 2001.

Cash Encounters Bally Gaming written by Strictly Slots, Apr. 2001.

Cossack Dance Advertisement written by Olympic Video Gaming, published prior to 2002.

Description of Symbol Feature in Australian UFO Gaming Machine written by Barcrest Ltd., published in 1995.

Double Diamond Line Advertisement written by Bally Gaming Systems, published in 2000.

Enchanted Forest™ Gaming Description from Aristocrat, available in 1994.

Enchanted Unicorn Advertisement written by IGT, published in 2001.

Fishin' Buddies Article published in Strictly Slots/Anchor Games, published in Apr. 2001.

Happy Camper Advertisement written by IGT, published in 2001.

Introducing the "Smiling Ape" Machine Advertisement (including Joker's Wild Poker description) written by IGT, published prior to 2001.

Jackpot Party Brochure and Articles written by WMS Gaming, Inc, published in 1988.

Joker's Wild Advertisement written by IGT, published prior to 2001.

Little Green Men, Jr. Advertisement written by A.C. Coin and Slot Services Company, published prior to 2002.

Loco Loot Article written by Strictly Slots/Aristocrat Leisure Industries, PTY Ltd., published in May 2002.

Mountain Money Article written by Strictly Slots/Aristocrat Leisure Industries, PTY Ltd., published in Jun. 2002.

Penguin Pays Advertisement written by Aristocrat Incorporated, published in 1998.

Reel Magic™ Gaming Machine Description written by IGT, available in 1986.

The Basics of Winning Video Poker (Chapter VI Deuces Wild & Chapter VII Jokers Wild) written by J. Edward Allen, published in 1990.

Wild Streak Advertisement written by WMS Gaming, Inc., published in 2001.

Your Real Key to Gaming Success Advertisement (including Roll Over Beethoven and Wild Fortune) written by Olympic Video Gaming, published prior to Jan. 2005.

* cited by examiner

GAMING DEVICE HAVING SYMBOLS WITH TRANSFORMATION PROBABILITIES

PRIORITY CLAIM

This application is a continuation of, claims the benefit of and priority to U.S. patent application Ser. No. 11/086,198 filed on Mar. 22, 2005, now U.S. Pat. No. 6,997,808 which is a continuation of and claims the benefit to U.S. patent application Ser. No. 10/255,880 filed on Sep. 26, 2002, now U.S. Pat. No. 6,921,355 which is a non-provisional application of and claims the benefit of and priority to U.S. Provisional Patent Application Ser. No. 60/325,976 filed Sep. 28, 2001, and which are incorporated herein in their entirety.

CROSS REFERENCES TO RELATED APPLICATIONS

This application relates to the following co-pending commonly owned U.S. patent applications: "GAMING DEVICE HAVING WILD INDICATORS" Ser. No. 10/982,096, and "GAMING DEVICE HAVING WILD INDICATORS" Ser. No. 11/015,842.

BACKGROUND OF THE INVENTION

Many known gaming devices provide wild symbols. Wild symbols provide a player with an additional opportunity to obtain winning combinations. The use of wild symbols in gaming devices provides additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If, in the gaming scheme, the gaming device awards a player for a three heart combination, the wild symbol substitutes for a heart and provides the player with that combination.

In one example, U.S. Pat. No. 6,089,977 discloses a gaming device having a roaming wild symbol. More specifically, this patent discloses a gaming device having a plurality of virtual reels which have a set of symbols. Certain symbol combinations serve as triggering events. When one of these combinations occurs on the reels, a wild card symbol appears on the reels in the form of a graphical image and appears along the reels in a set, predetermined path. As the wild card symbol appears at a location, the symbols transform into the wild card symbol. After each appearance of the wild card symbol, the gaming device determines and pays the player for any winning combination which is the result of the transformation. When the wild card symbol appears at the next adjacent symbol, the symbol previously transformed reverts to its original state.

To increase player enjoyment and excitement, it is desirable to provide gaming devices having new and different wild symbol schemes.

SUMMARY OF THE INVENTION

The present invention provides a gaming device which includes symbols which in one embodiment, when displayed, may transform into wild symbols or other functional symbols based on a transformation probability associated with one or more of the particular displayed symbols. In one preferred embodiment of the present invention, the gaming device includes an activator symbol. When the activator symbol is displayed, a processor of the gaming device determines the transformation probability associated with each of the symbols displayed within a display device and randomly determines which, if any, of the displayed symbols are to be transformed into functional symbols such as wild symbols based on the transformation probability of the displayed symbols.

In one embodiment, the gaming device includes a plurality of reels having a plurality of symbols. Each of the symbols has a transformation probability associated with that symbol. The plurality of reels also includes one or more activator symbols. A display device displays the plurality of reels. A player activates the reels using conventional control features of the gaming device. A plurality of the symbols on the reels are displayed within the display device. In addition, at certain times, an activator symbol is displayed within the display device. When the activator symbol is displayed, the processor determines the transformation probability of, or associated with, each of the symbols displayed within the display device. The processor then randomly determines which, if any, symbols will be transformed into functional symbols based on the transformation probability of each of the symbols, and transforms those symbols into functional symbols. In one embodiment, the symbols are transformed simultaneously and the processor determines whether the player has achieved any winning outcomes after transforming all of the appropriate symbols. In one embodiment, the processor transforms the symbols into functional symbols successively. In this embodiment, the processor transforms a first symbol into a wild symbol and determines if the player has achieved any winning outcomes. The first symbol reverts back to its original state and the processor transforms a second symbol into a wild symbol. The processor then determines if the player has achieved any winning outcomes based on the second transformation. In alternative embodiments, the symbols are transformed into other types of functional symbols such as credit values which the player receives, or additional primary or free game symbols or bonus trigger symbols. In one preferred embodiment, the gaming device includes a graphical display that graphically illustrates the activator symbol causing the processor to transform the appropriate symbols into functional symbols.

In one alternative embodiment of the present invention, the transformation probability is associated with the activator symbol instead of the other displayed symbols. When the activator symbol is displayed along with the symbols on the reels, the processor uses the transformation probability of the activator symbol to individually determine whether one or more of the symbols displayed will be transformed into functional symbols. The processor randomly determines which, if any, symbols are functional symbols based on the transformation probability associated with the activator symbol and transforms those symbols into functional symbols.

In one alternative embodiment, the processor provides a visual indication to the player of which symbol or symbols will be transformed prior to transforming the symbol. This may be done in any suitable manner such as by highlighting or shading symbols, or by using a pointer or by indicating a path.

In one embodiment, the display device may display a plurality of activator symbols. When this occurs, the processor determines the transformation probability of, or associated with, each of the symbols displayed with respect to each of the plurality of activator symbols displayed. The processor may then randomly determine symbols to be transformed into functional symbols based on the transformation probability of each of the symbols and transform each of the symbols into functional symbols such as wild symbols simultaneously or successively with respect to each of the activator symbols, and simultaneously or successively with respect to each of the symbols. If a particular symbol is transformed into a wild symbol or other functional symbol in association with more than one activator symbol, the processor may apply a multiplier to the value of the winning combination or the functional symbol in determining the award the player receives. Alternatively, the processor may employ the transformation probabilities associated with such activator symbols. The processor may also alternatively determine which activator symbol to employ as discussed below.

In another embodiment, one or more activators designate symbols for transformation until a condition occurs, at which point, the symbols that were designated for transformation by one or more of the activators are no longer designated for transformation.

A further alternative embodiment of the present invention includes more than one or multiple transformations of the same symbol based on multiple transformation probabilities. For instance, probabilities associated with more than one activator symbol displayed on the display device may be employed to determine if a symbol will be transformed multiple times. Alternatively, one or more symbols could have multiple associated transformation probabilities. Further alternatively, an activator symbol could cause multiple determinations of transformation for one or more symbols or groups of symbols.

It is therefore an advantage of the present invention to provide a gaming device having transformation probabilities associated with symbols wherein the transformation probabilities are used to determine whether the symbols transform into functional symbols.

Additional features and advantages of the present invention are described in, and will be apparent from, the following Detailed Description of the Invention and the figures.

DETAILED DESCRIPTION OF THE INVENTION

Gaming Device and Electronics

Figure 1A:
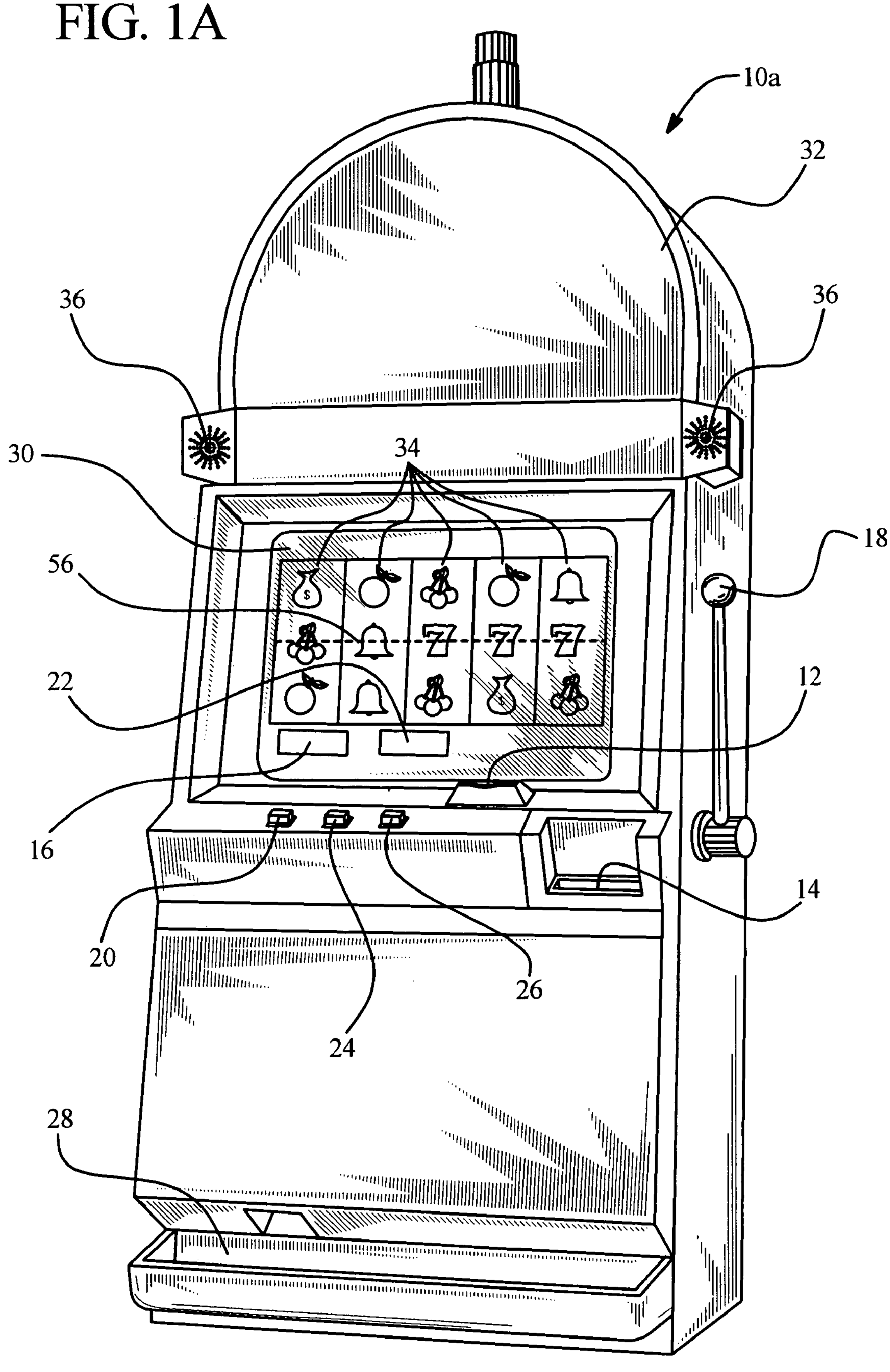
FIGS. 1A and 1B are perspective views of alternative embodiments of the gaming device of the present invention.
Figure 1B:
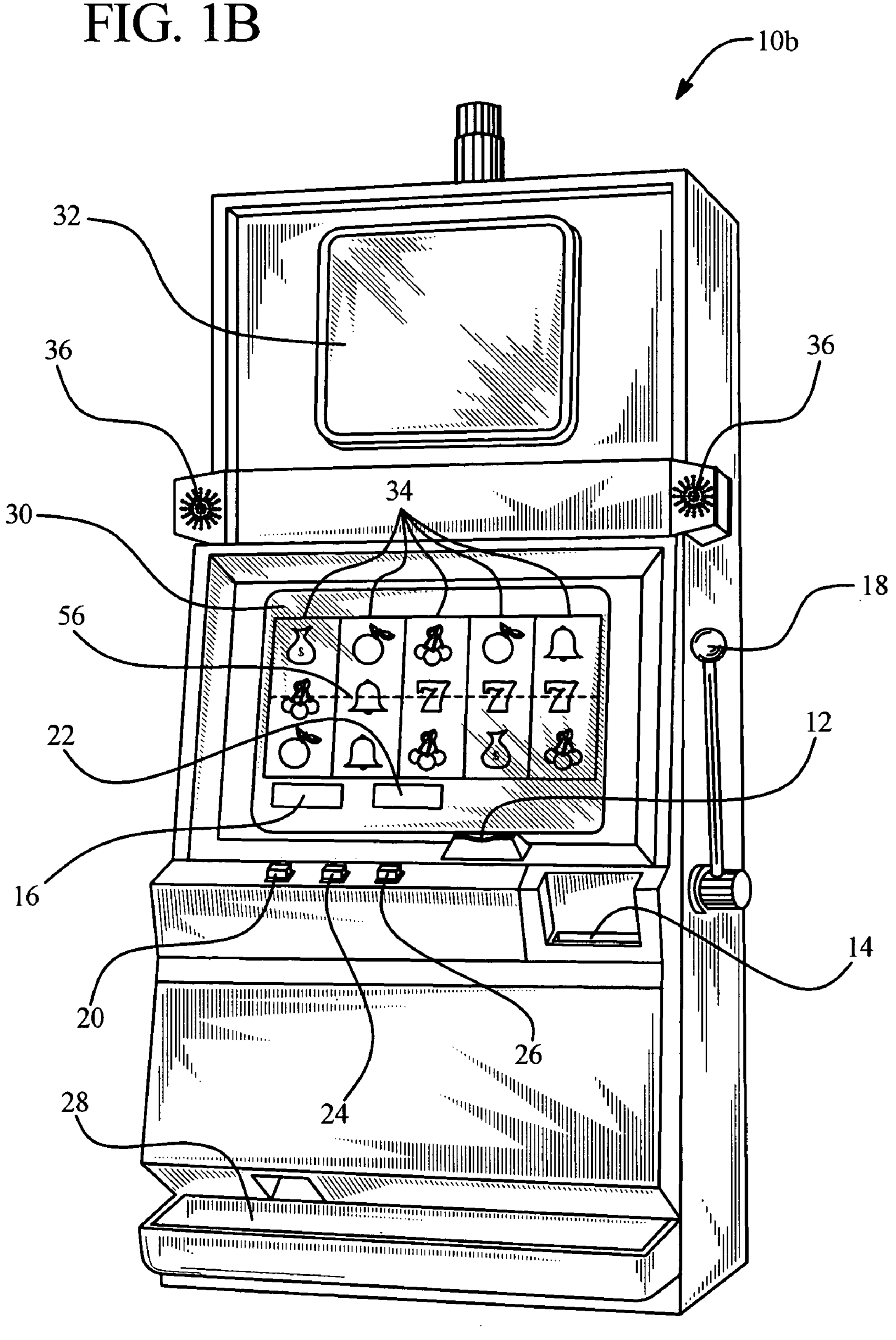

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game, described below, being a stand alone game or a bonus or secondary game that coordinates with a base game. The gaming device 10 can be a slot machine having the controls, displays and features of a conventional slot machine, or another game such as a video card game such as poker. The player can operate the gaming device while standing or sitting. Gaming device 10 also includes being a pub-style or table-top game (not shown), which a player operates while sitting.

The gaming device 10 may include any bonus triggering events, bonus games as well as any progressive game coordinating with the base game. The symbols and indicia used for any of the base, bonus and progressive games include mechanical, electrical, electronic or video symbols and indicia.

In a standalone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The player may cash out by pushing the cash out button 26 to receive coins or tokens in the coin payout tray 28 or other forms of payment, such as an amount printed on a ticket or credited to a credit card, debit card or smart card.

Gaming device 10 also includes one or more display devices. The embodiment shown in FIG. 1A includes a central display device 30, and the alternative embodiment shown in FIG. 1B includes a central display device 30 as well as an upper display device 32. The display device includes any viewing surface such as glass, a video monitor or screen, a liquid crystal display or any other static or dynamic display mechanism. In a video poker, blackjack or other card gaming machine primary game embodiment, the display device includes displaying one or more cards.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
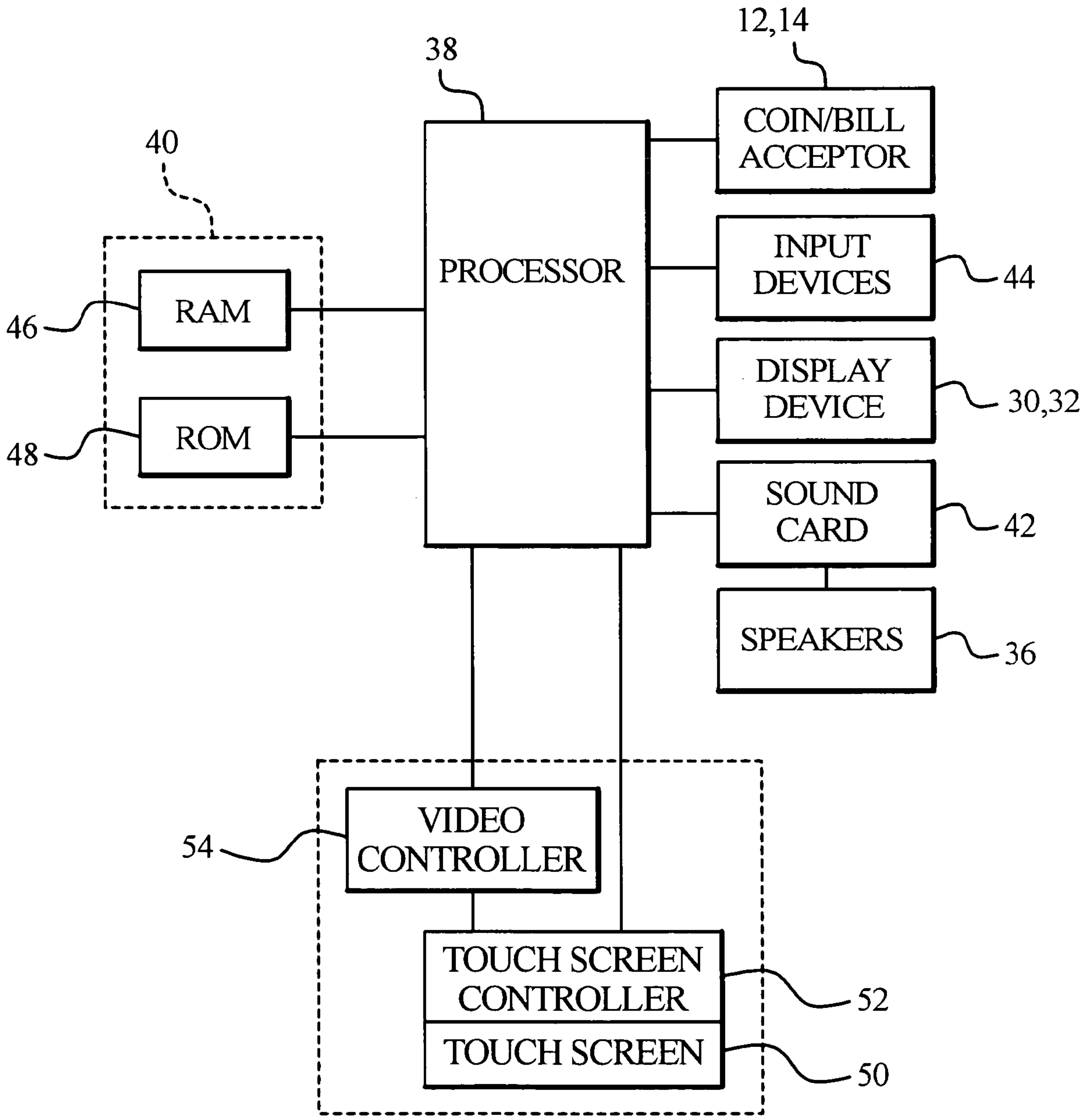
FIG. 2 is a schematic block diagram of the electronic configuration of one embodiment of the gaming device of the present invention.

Referring now to FIG. 2, a general electronic configuration of the gaming device 10 for the standalone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 is connected to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

Symbols Having Transformation Probabilities

Figure 3:
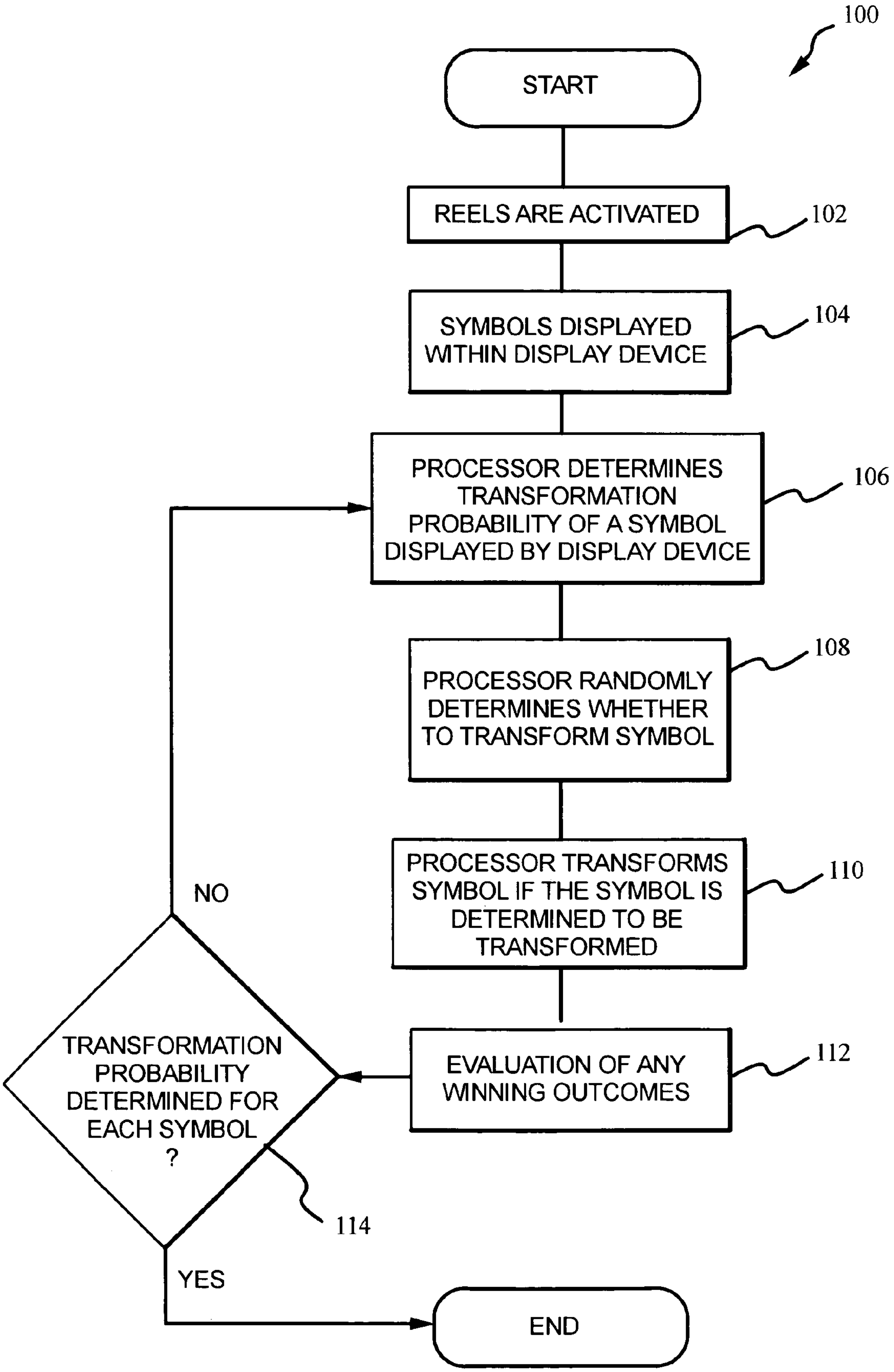
FIG. 3 is a flow diagram of one method of one embodiment of the present invention.

FIG. 3 provides an overview of a process or method 100 of one embodiment of the present invention. When the game begins, a plurality of reels are activated as indicated by block 102. A plurality of symbols are then randomly generated and displayed by or within a display device as indicated by block 104. First, the processor determines conventional wins, if any. In one embodiment, upon a suitable triggering event, the processor of the gaming device determines the transformation probability of a first symbol displayed within the display device as indicated by block 106. Preferably, the transformation probability is greater than or equal to zero and less than one. The transformation probability of the symbol is the probability that the symbol will be transformed into a wild symbol or other functional symbol such as a credit value. In one embodiment, the transformation probability is contained within a table that is stored within a memory device accessible or in communication with the processor of the gaming device. The processor accesses the transformation probability associated with the appropriate symbol. Preferably, the transformation probability is different for one or more of the symbols. In one embodiment, each symbol or type of symbol such as BARS or cherries may have the same transformation probability for the same type of symbol and different probabilities for different types of symbols. In one embodiment, the transformation probability depends on the position of the symbols relative to the activation symbol discussed below or another location such as the center of the reels.

Next, the processor determines whether to transform a first symbol based on the transformation probability associated with that symbol, as indicated by block 108. This may be done by a random calculation or in some other suitable order. If randomly determined to be wild, the processor transforms the symbol into a wild symbol or other functional symbol, as indicated by block 110. Then, the processor makes an evaluation to determine if there are any winning outcomes displayed within the display device, as indicated by block 112. As indicated by diamond 114, if the processor has determined the transformation probability of all of the symbols and has performed random determinations for all of the symbols, the game ends; however, if the processor must still determine the transformation probability of other symbols and randomly determine whether those symbols are to be functional symbols, the processor again performs the steps indicated by blocks 106, 108 and 110 for each symbol. In one alternative embodiment, the game could provide a terminator or a terminating event which prevents further transformations. Once all appropriate symbols are transformed, the game ends.

Figure 4A:
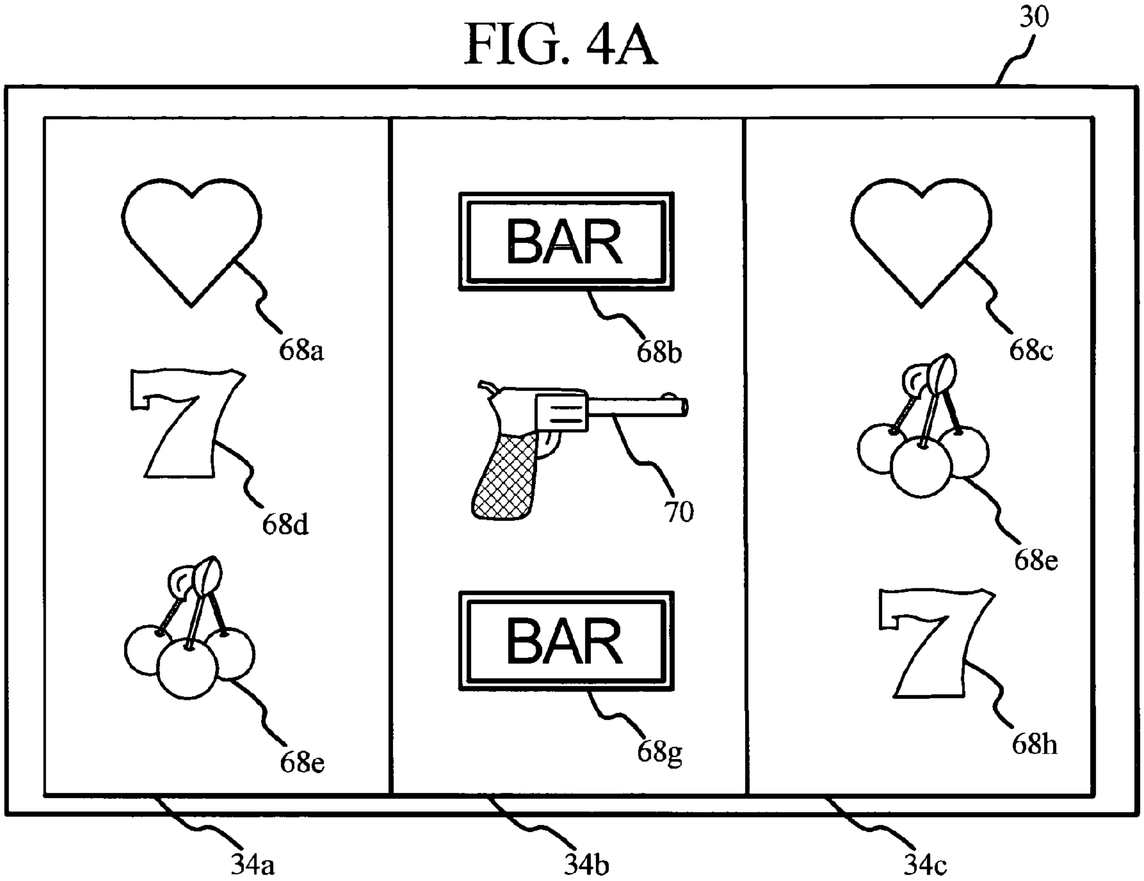
FIGS. 4A, 4B and 4C are front elevation views of a display device in which an activator symbol is displayed on a set of reels.
Figure 4B:
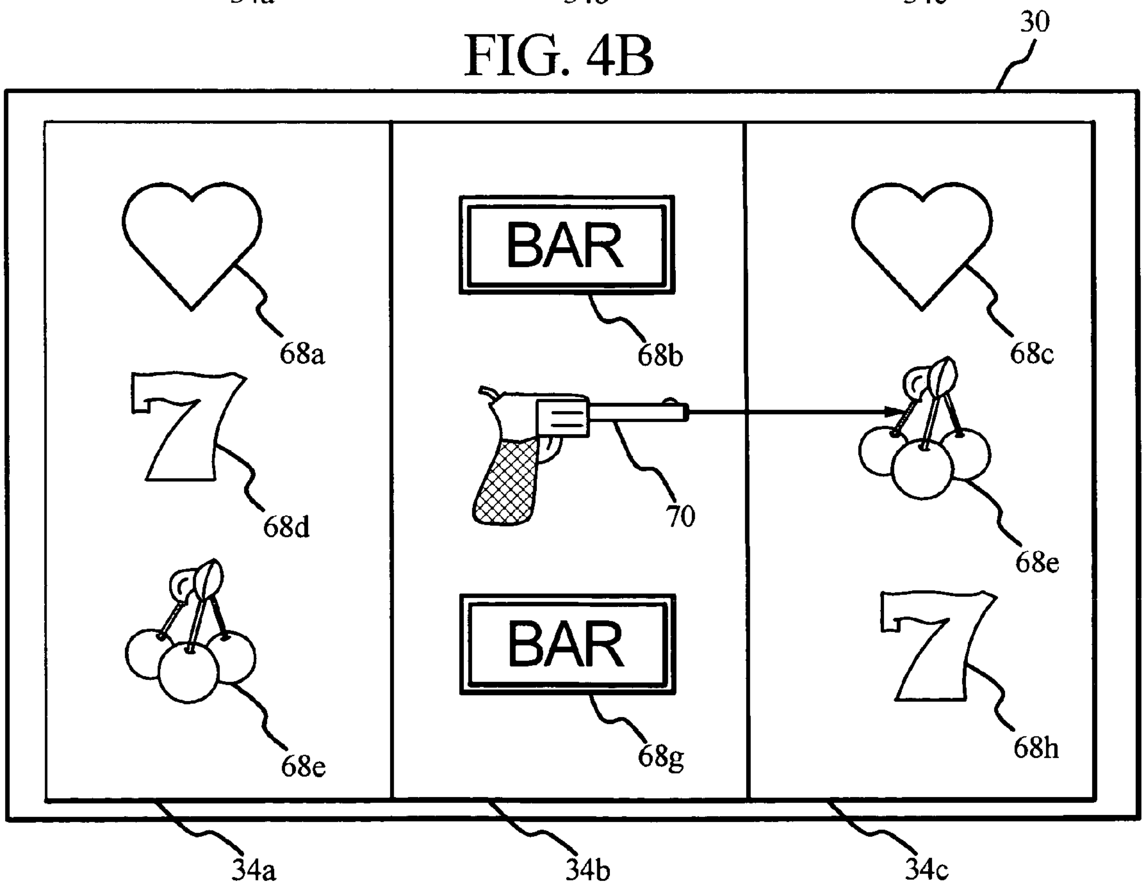
Figure 4C:
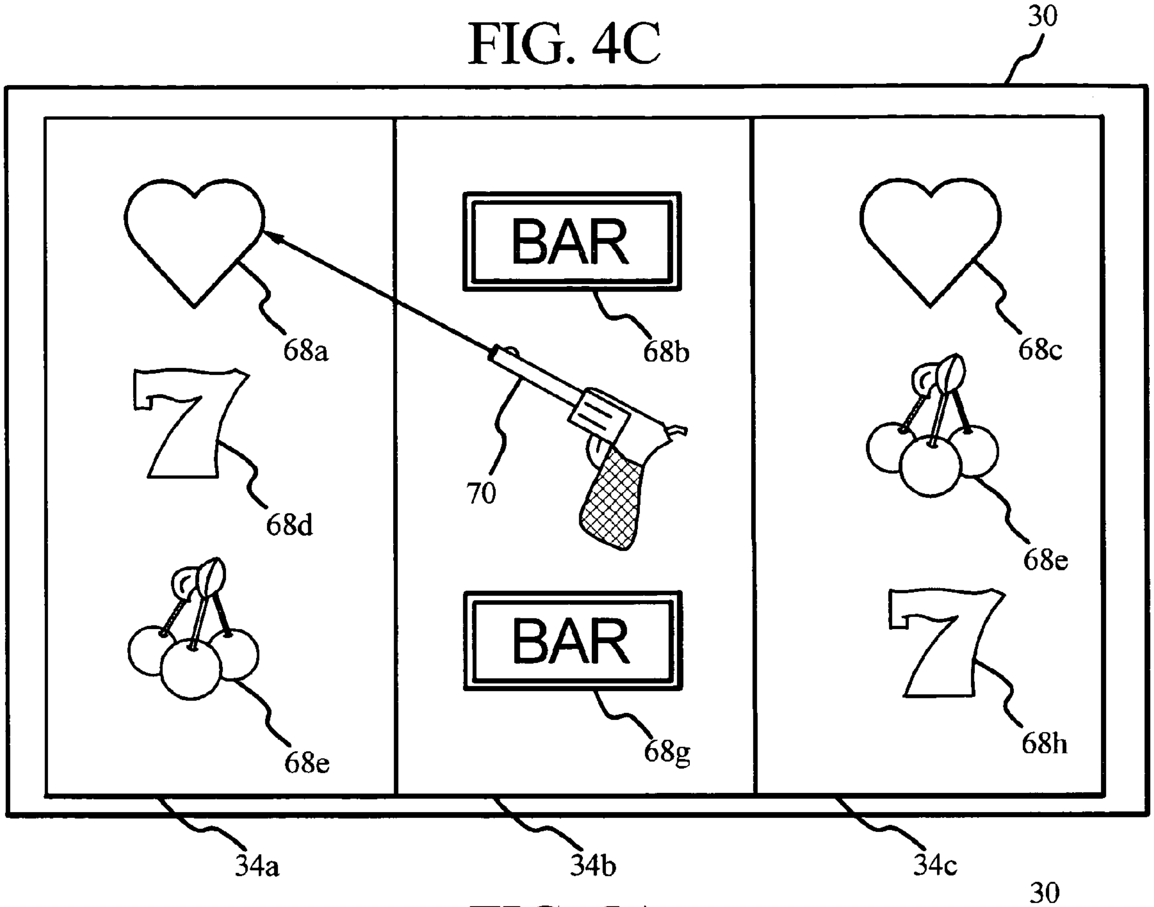

In one embodiment, a display device 30 displays a plurality of reels 34*a*, 34*b* and 34*c* as illustrated in FIG. 4A. The reels include a plurality of symbols 68*a* through 68*h*. In this embodiment, the reels also include at least one activator symbol 70 which may be displayed within the display device. In FIG. 4A, the activator symbol 70 is displayed in a middle position of the second reel 34*b*. When the activator symbol is displayed within the display device, the processor determines the transformation probability of, or associated with, each of one or more symbols displayed within the display device. In one example, the processor randomly determines that a symbol 68*e* in the middle position on the third reel will become a functional symbol, and more specifically, a wild symbol, based on the transformation probability of that symbol. The processor then transforms that symbol into a wild symbol, which may be performed in any suitable manner. For example, in FIG. 4B, the activator symbol appears to shoot, or send a ray towards, or provide any other suitable indicator to the symbol 68*e* on the third reel 34*c* which is determined to be a wild symbol. In this embodiment, the symbol or symbols chosen to become wild become wild symbols successively. The processor evaluates whether any winning outcomes occurred when the symbol 68*e* transformed into a wild symbol. Then, as shown in FIG. 4C, the activator symbol 70 appears to send a ray towards a second symbol 68*a* located in a top position of the first reel 34*a* which the processor has randomly determined to be a wild symbol based on the transformation probability associated with that symbol. The processor then evaluates whether the player has achieved any winning outcomes.

Figure 5A:
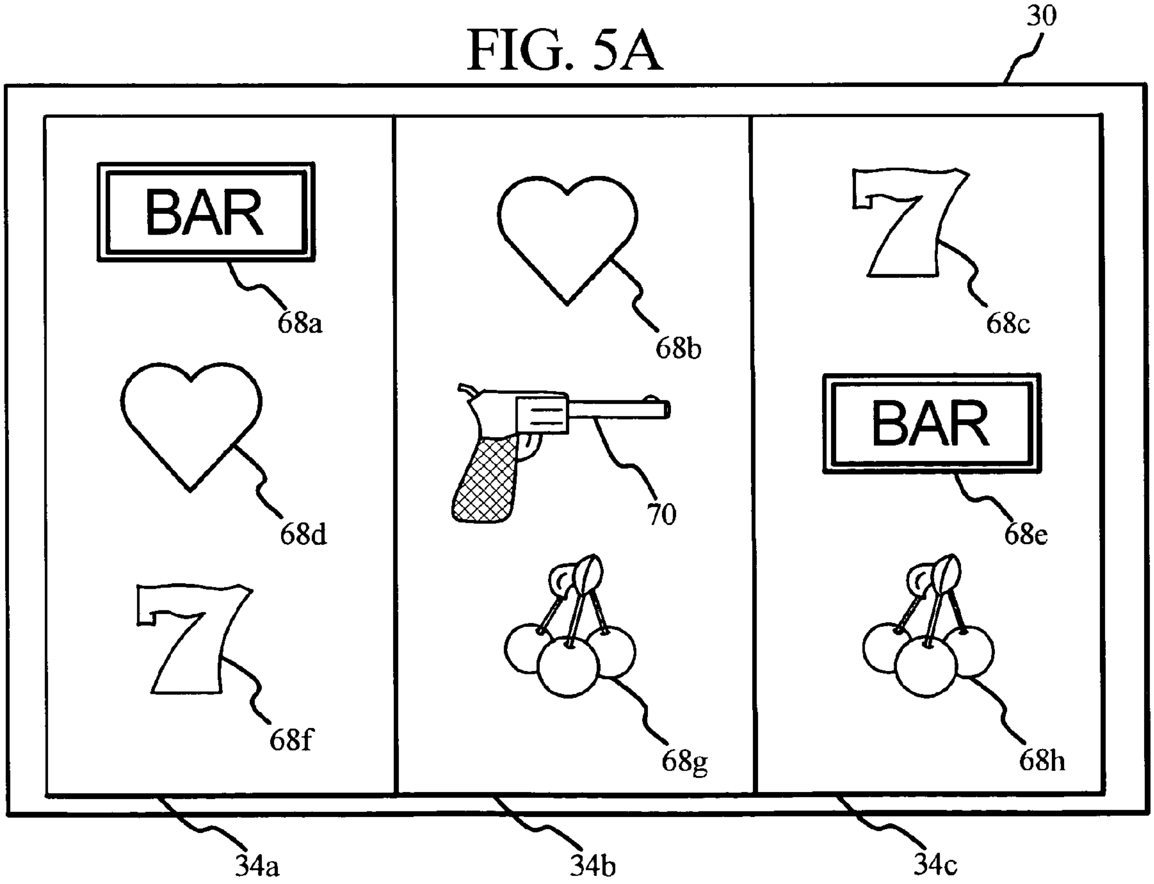
FIGS. 5A, 5B and 5C are front elevation views of a display device in which an activator symbol is displayed on a set of reels.
Figure 5B:
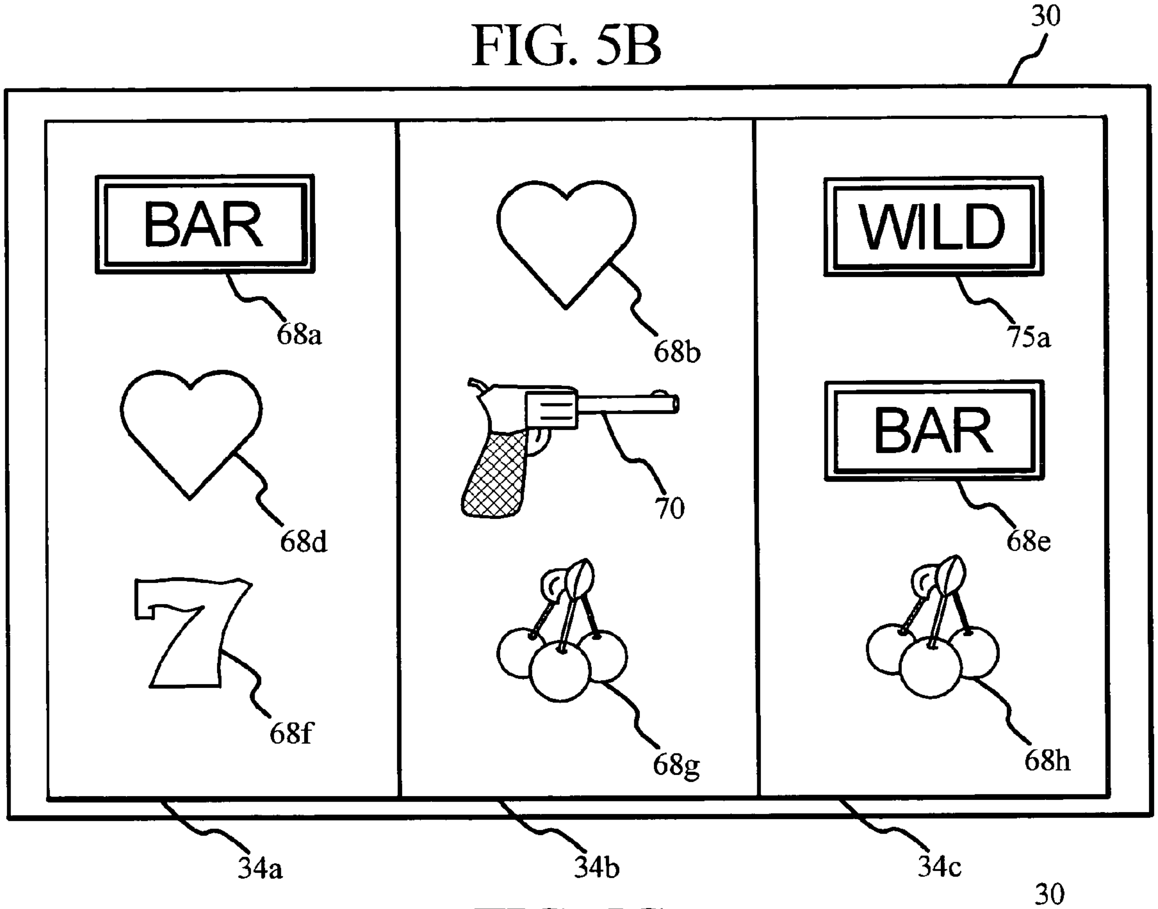
Figure 5C:
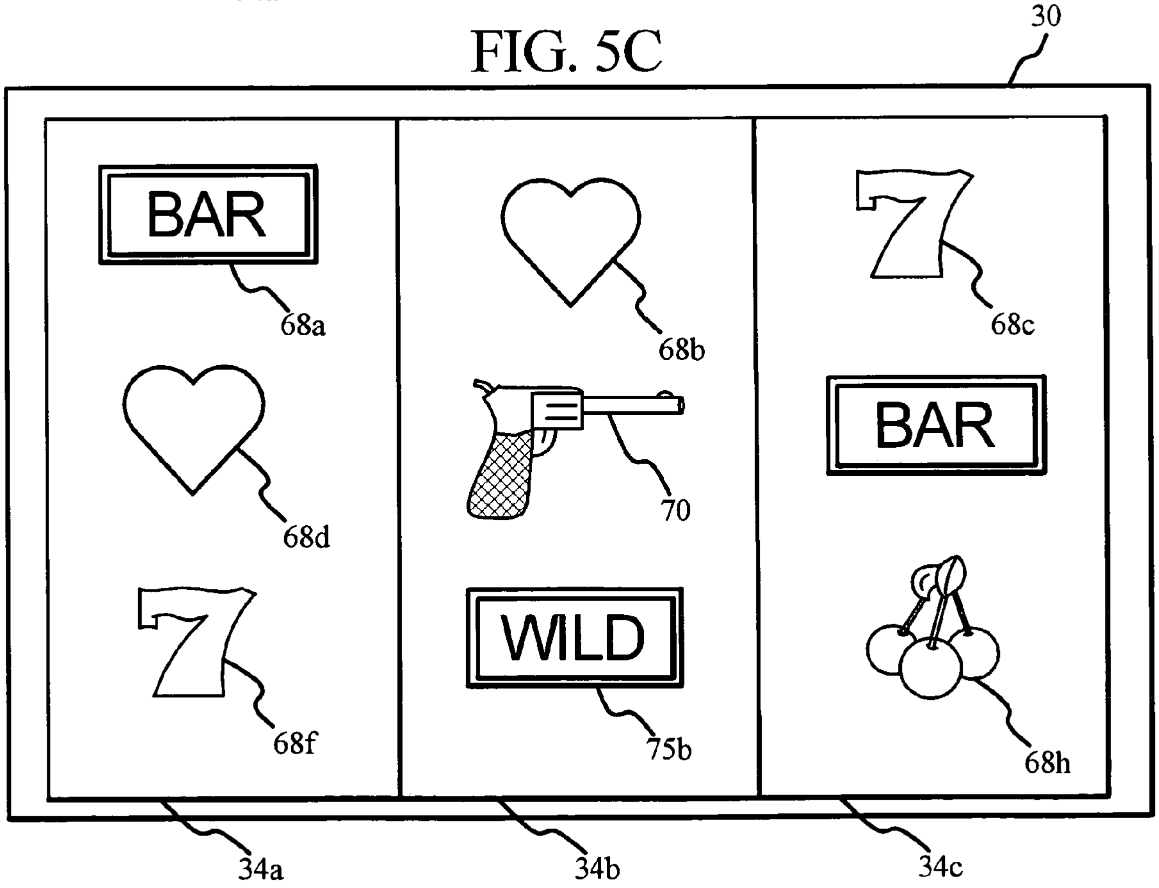

It should be appreciated that the processor can convey to a player that a symbol has been determined to be a functional symbol such as a wild symbol in any suitable manner. For example, in FIG. 5A, an activator symbol 70 is displayed in the middle position of the second reel 34*b*. The processor determines the transformation probability of each symbol 68*a* through 68*h* also displayed within the display device. The processor then randomly determines, for example, that the symbol 68*c* in the top position of the third reel 34*c* is a wild symbol based on the transformation probability of the symbol. The processor transforms the symbol in the top position of the third reel into a wild symbol 75*a* as shown in FIG. 5B. Next, the processor randomly determines that the symbol 68*g* in the bottom position of the second reel 34*b* is a wild symbol based on the transformation probability of that symbol. The processor transforms the symbol in the bottom position of the second reel into a wild symbol as shown in FIG. 5C. In an embodiment in which the reels are mechanical, backlighting or other lighting can be used to indicate transformation of symbols into functional symbols such as wild symbols.

In one alternative embodiment, the processor first determines which symbols will be transformed, then indicates the symbols to be transformed to the player, and then transforms the determined symbols in a suitable sequential or simultaneous fashion.

Figure 6A:
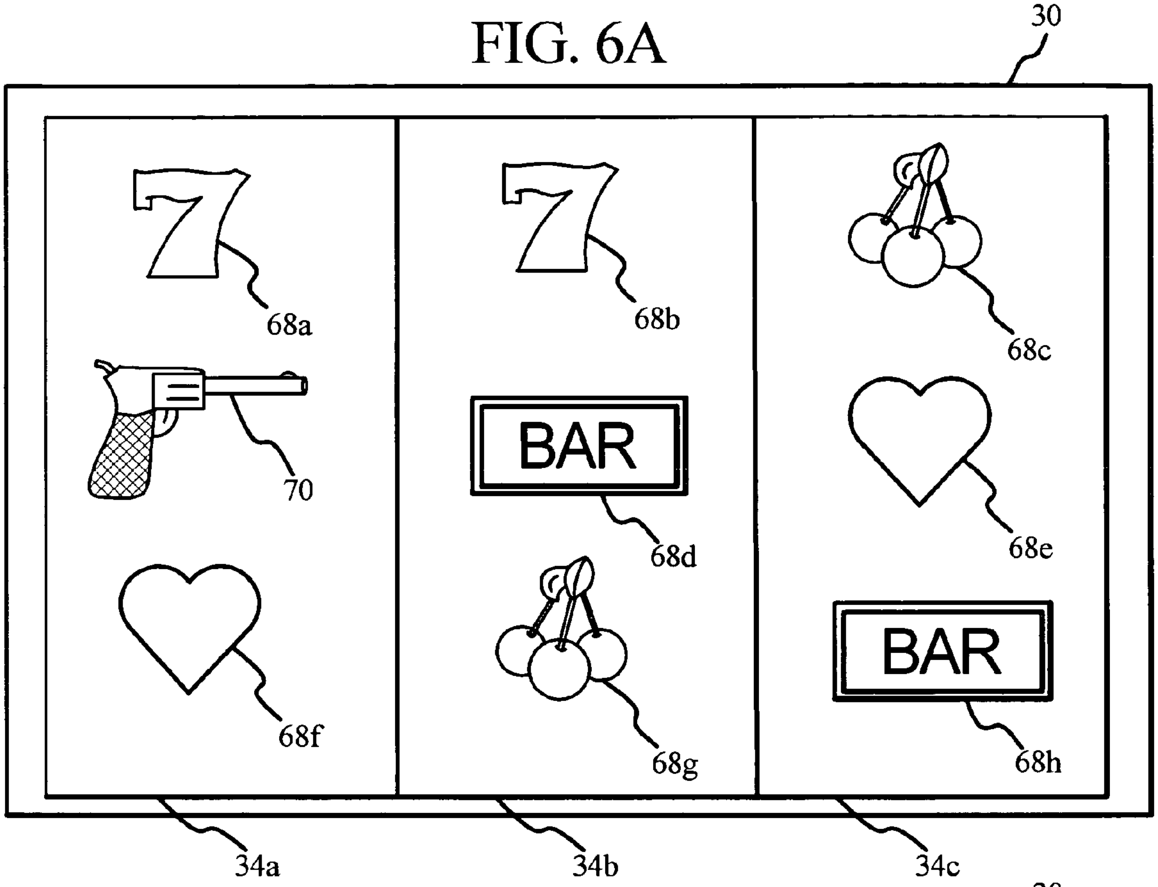
FIGS. 6A and 6B are front elevation views of a display device in which an activator symbol is displayed on a set of reels and symbols are transformed into functional symbols simultaneously.
Figure 6B:
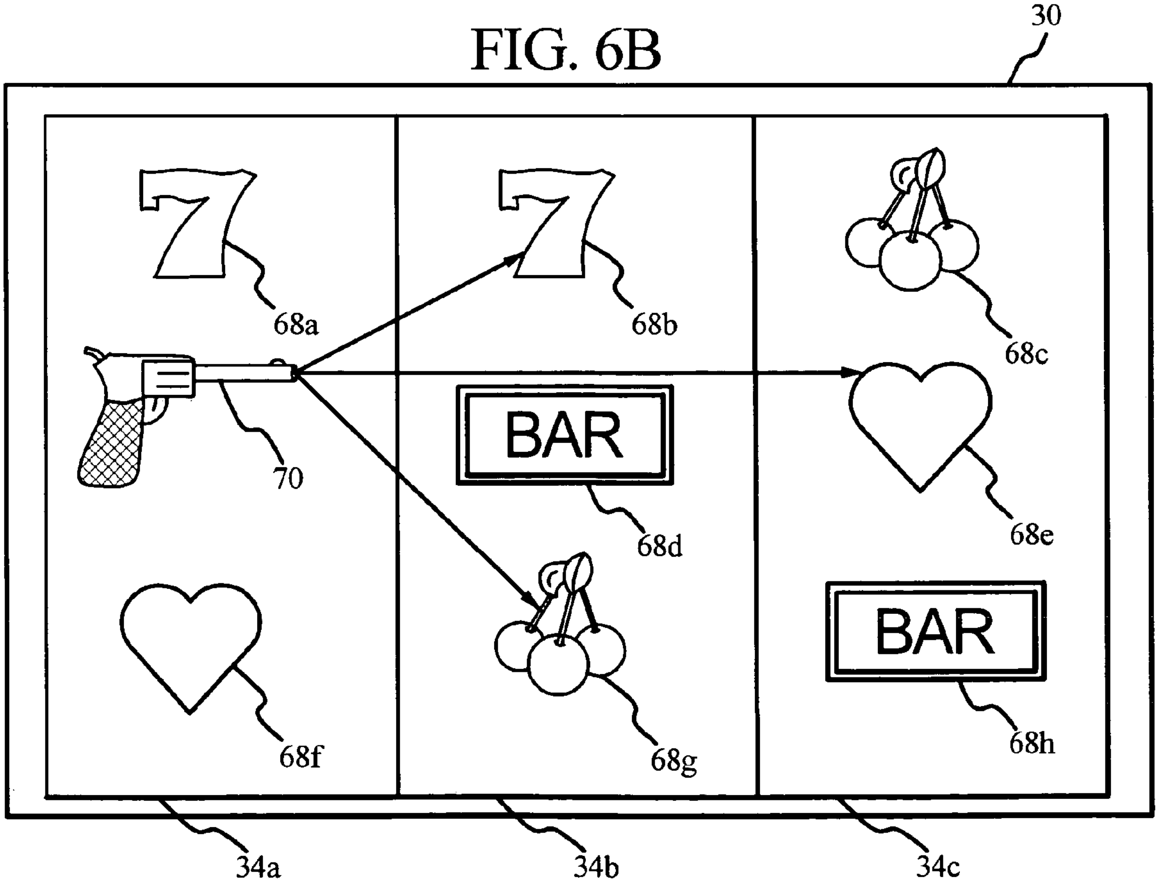

In one embodiment, the processor transforms each symbol determined to be a functional symbol in a simultaneous manner. For example, the display device displays a plurality of reels including a plurality of symbols as shown in FIG. 6A. An activator symbol 70 is displayed in the middle position of the first reel 34*a*. The processor determines the transformation probability of each of the symbols 68*a* through 68*h* displayed within the display device. The processor then randomly determines, for example, that the symbol 68*b* in the top position of the second reel 34*b*, the symbol 68*g* in the bottom position of the second reel 34*b* and the symbol 68*e* in the middle position of the third reel 34*c* will become a functional symbol such as a wild symbol based on the transformation probability of each of these symbols. The processor transforms these symbols into wild symbols simultaneously, as indicated in FIG. 6B.

Figure 7A:
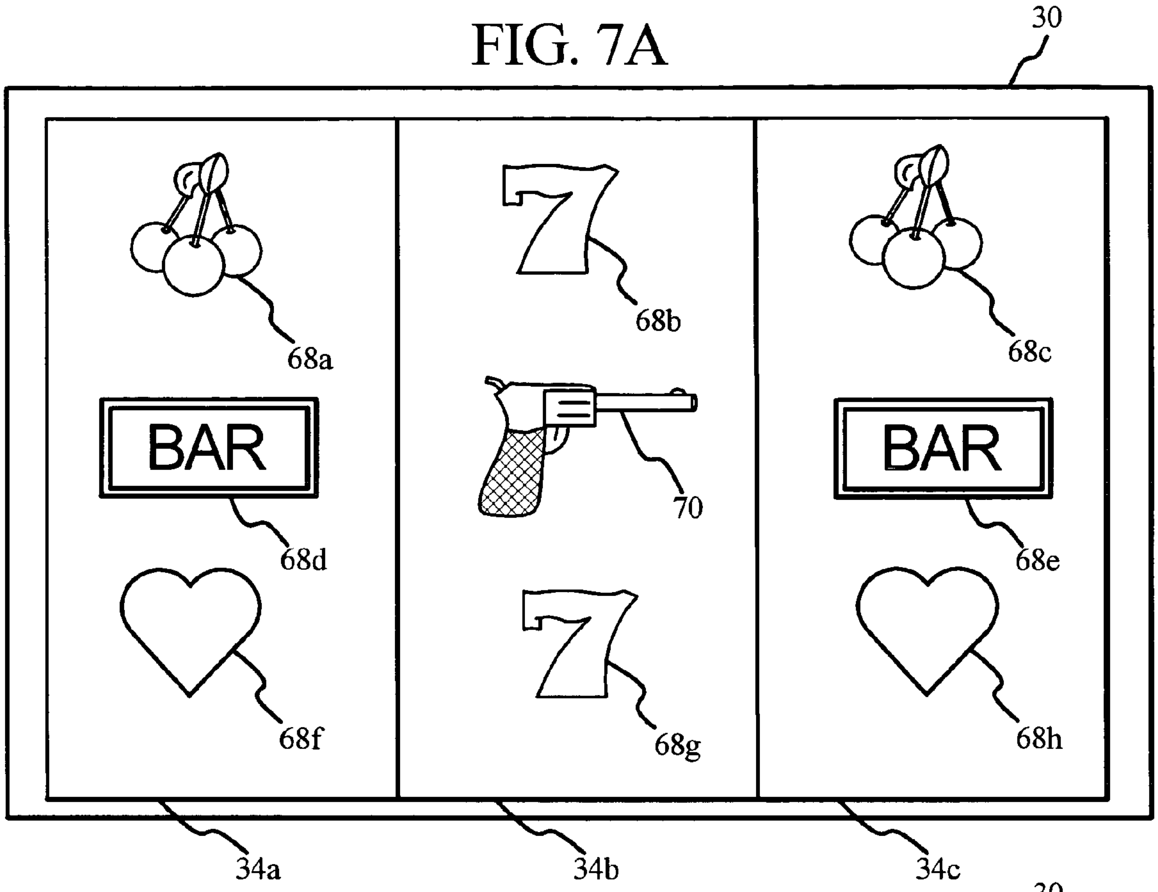
FIGS. 7A and 7B are front elevation views of a display device in which an activator symbol is displayed on a set of reels.
Figure 7B:
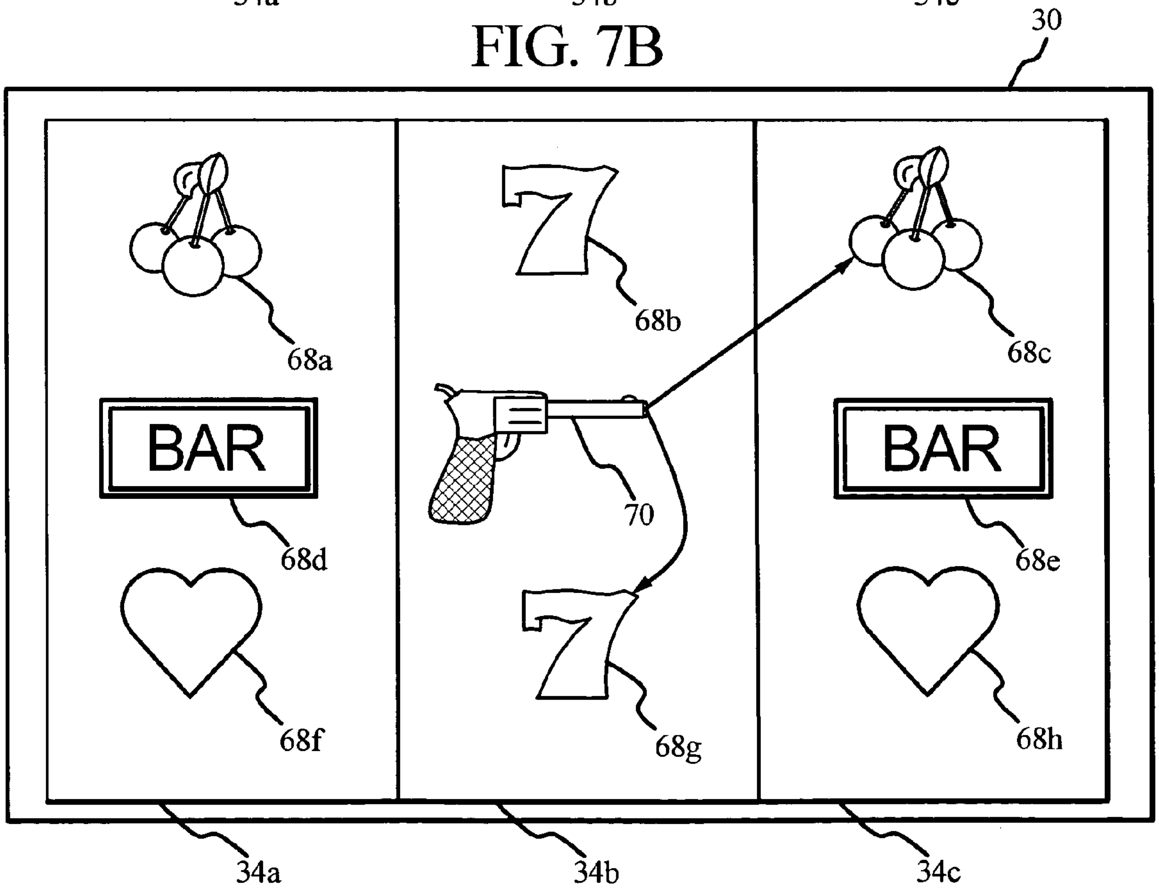

In one embodiment, the symbols that are randomly determined to be functional symbols may only occupy specific positions of a reel, such as the top position or the bottom position of the first, second or third reel. For example, the display device displays a plurality of reels including a plurality of symbols as shown in FIG. 7A. An activator symbol 70 is also displayed in the middle position of the second reel 34*b*. The processor determines the transformation probability of each of the symbols 68*a*, 68*b* and 68*c* in the top position of the first, second and third reels and each of the symbols 68*f*, 68*g* and 68*h* in the bottom position of the first, second and third reels. The processor randomly determines certain symbols to be wild symbols based on the transformation probability associated with each of the symbols in the top or bottom position of the reels, as indicated in FIG. 7B. In this embodiment, the symbols are transformed simultaneously; however, the symbols may also be transformed successively or in any other manner.

Figure 8A:
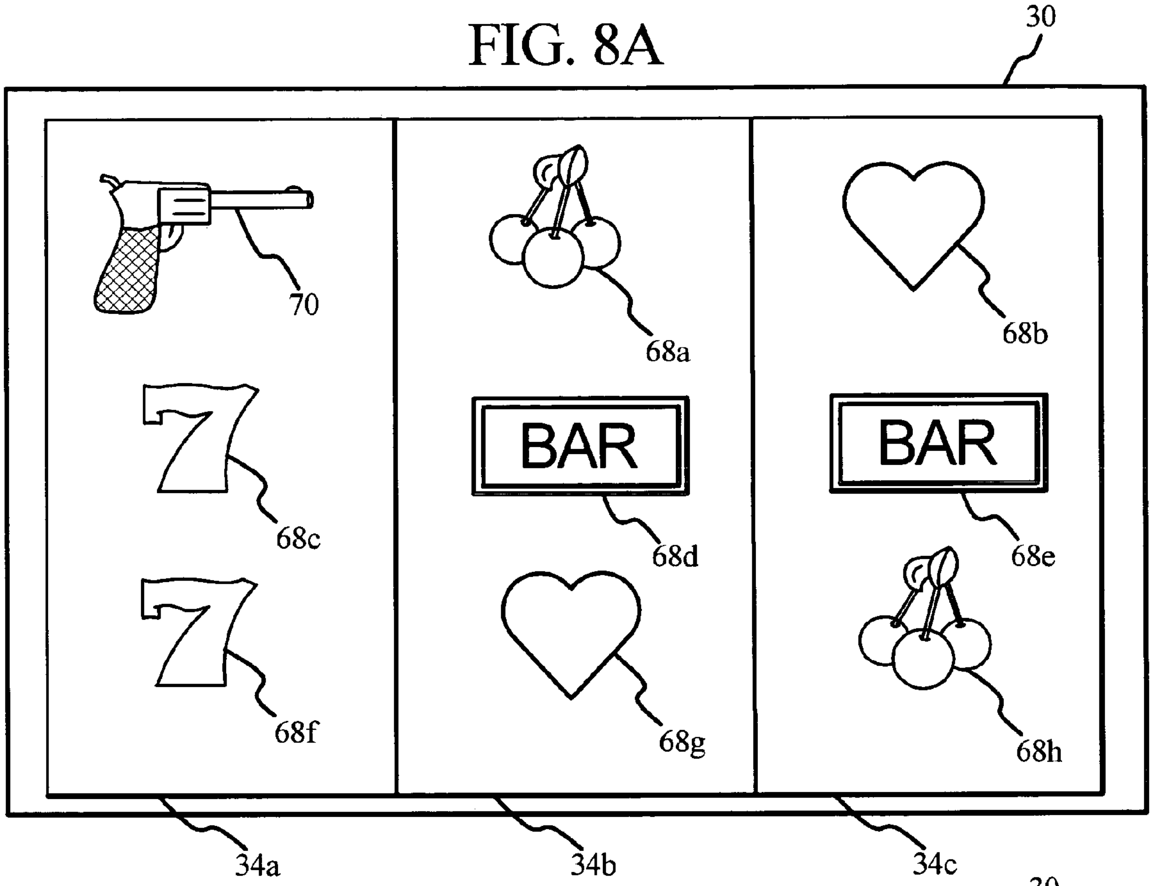
FIGS. 8A, 8B, 8C, 8D and 8E are front elevation views of a display device in which an activator symbol is displayed on a set of reels and symbols are transformed into functional symbols.
Figure 8B:
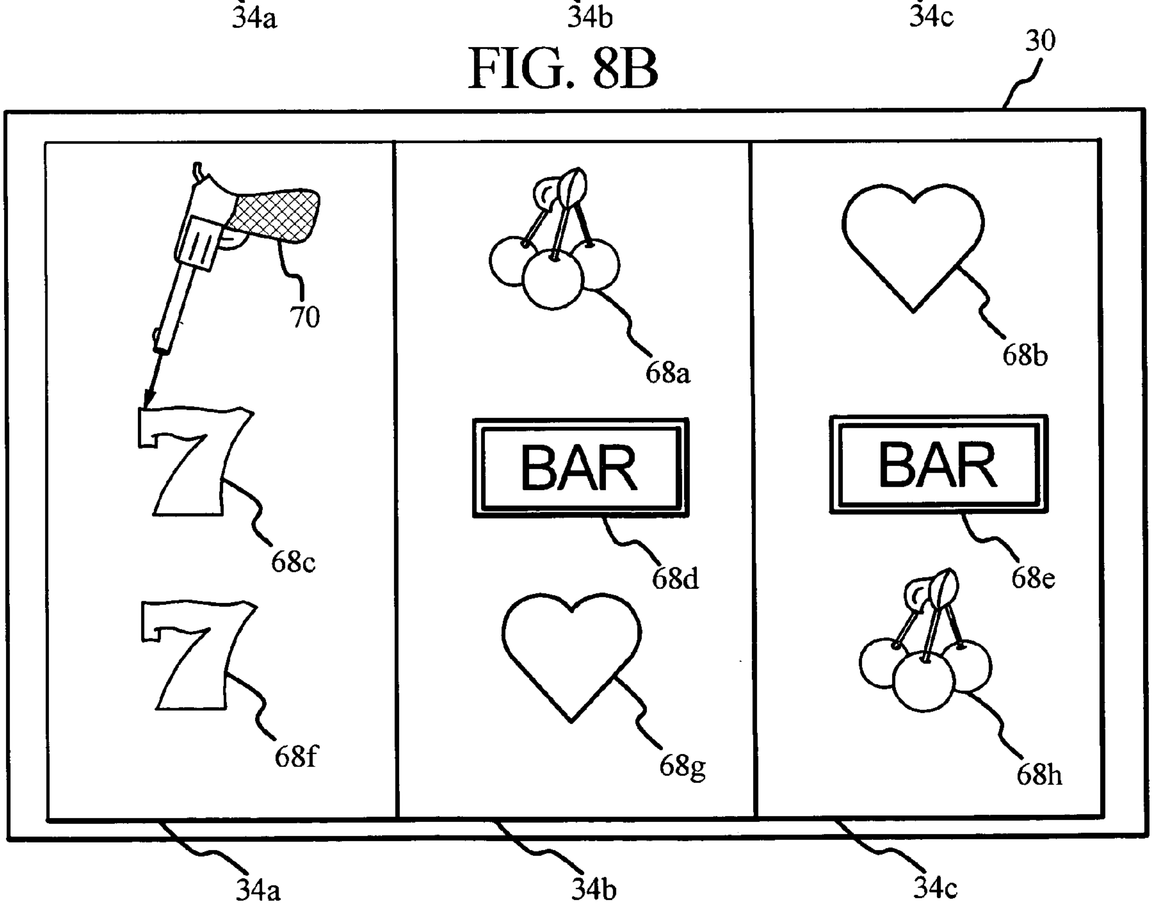
Figure 8C:
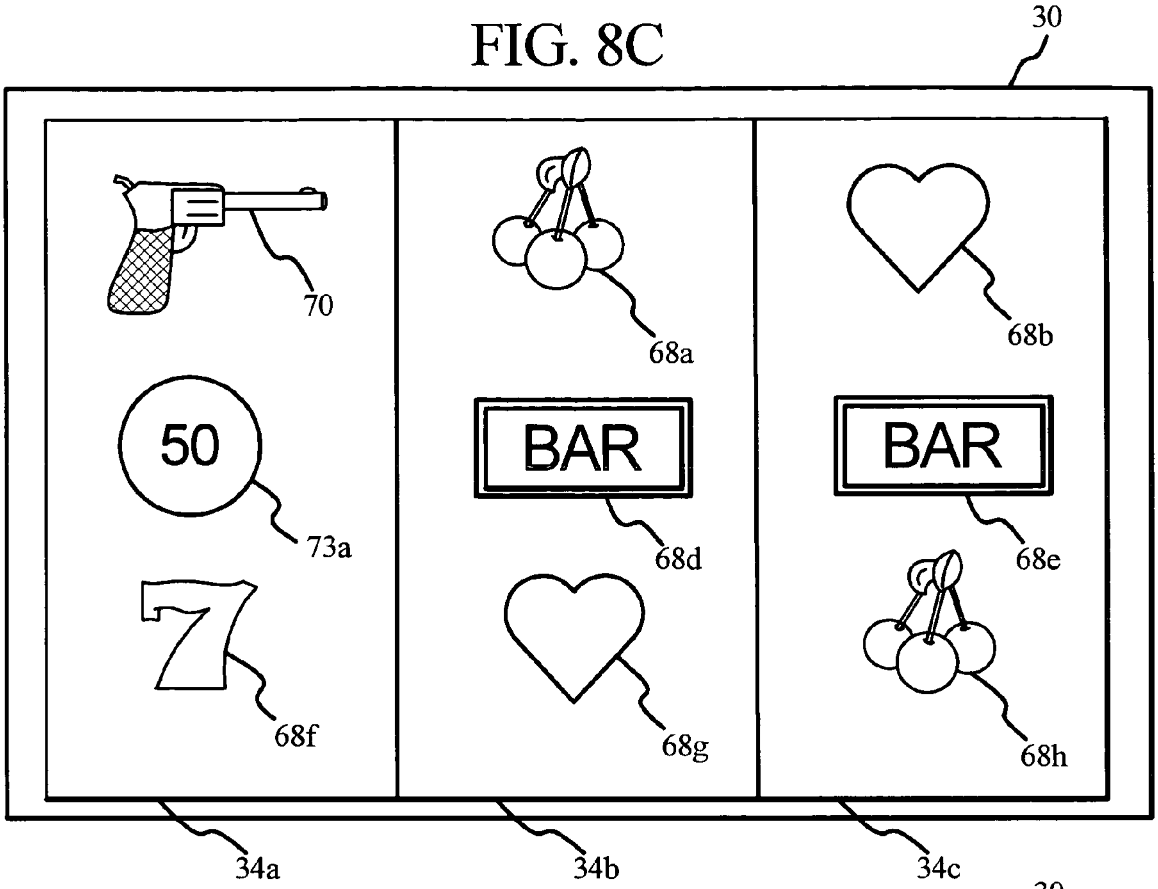
Figure 8D:
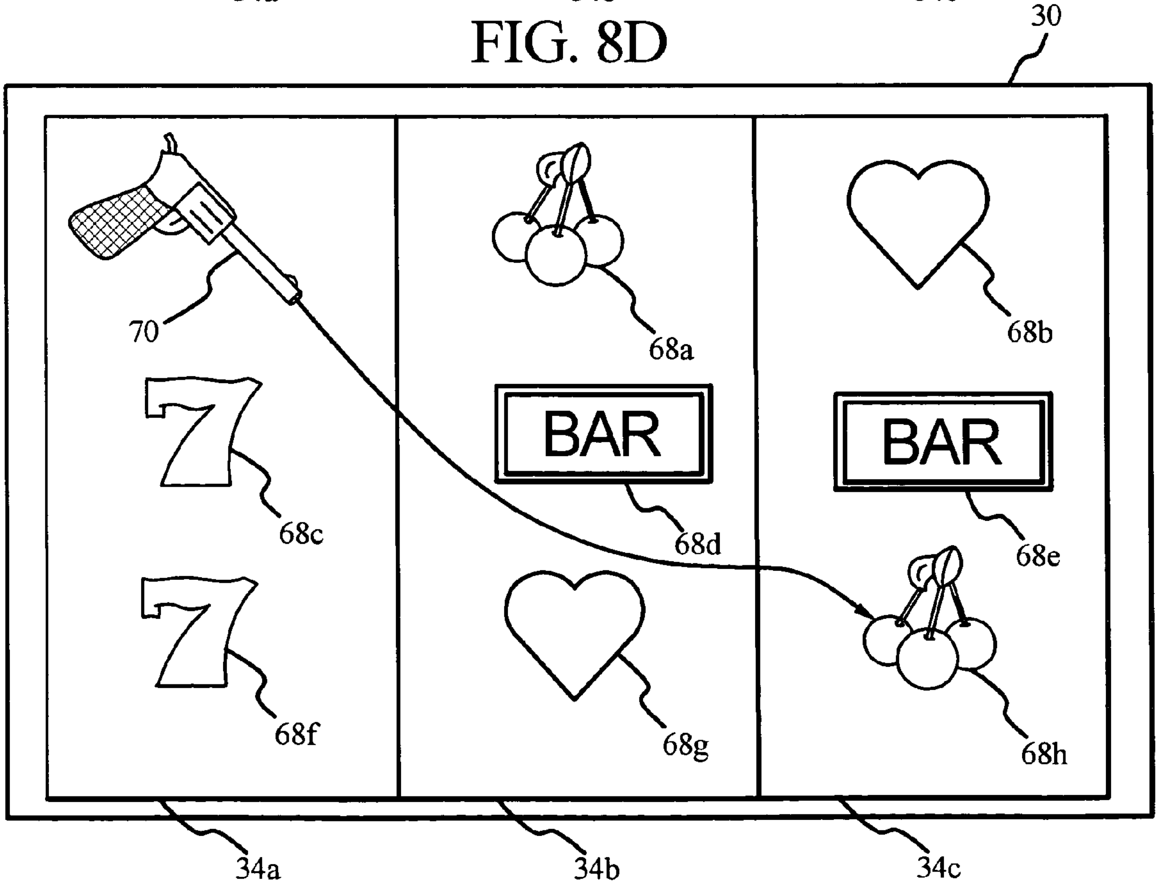
Figure 8E:
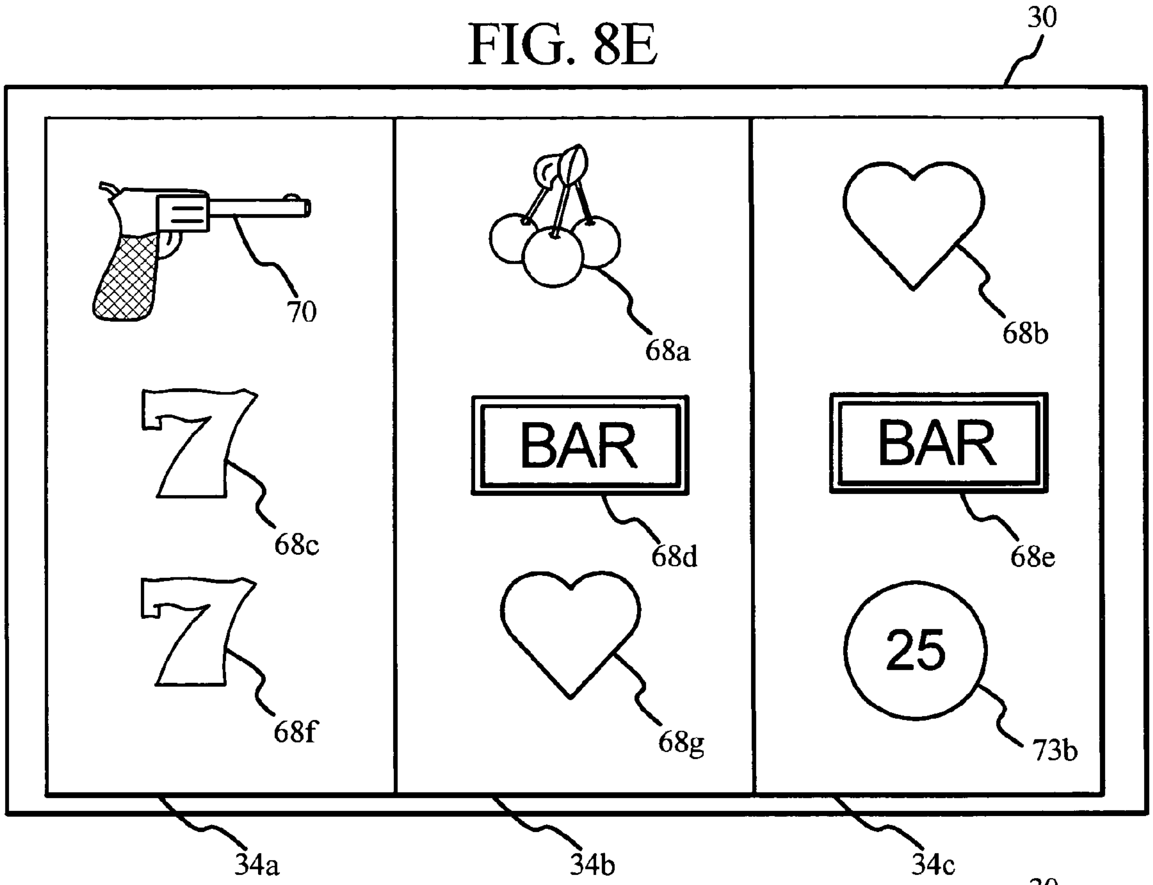
Figure 9A:
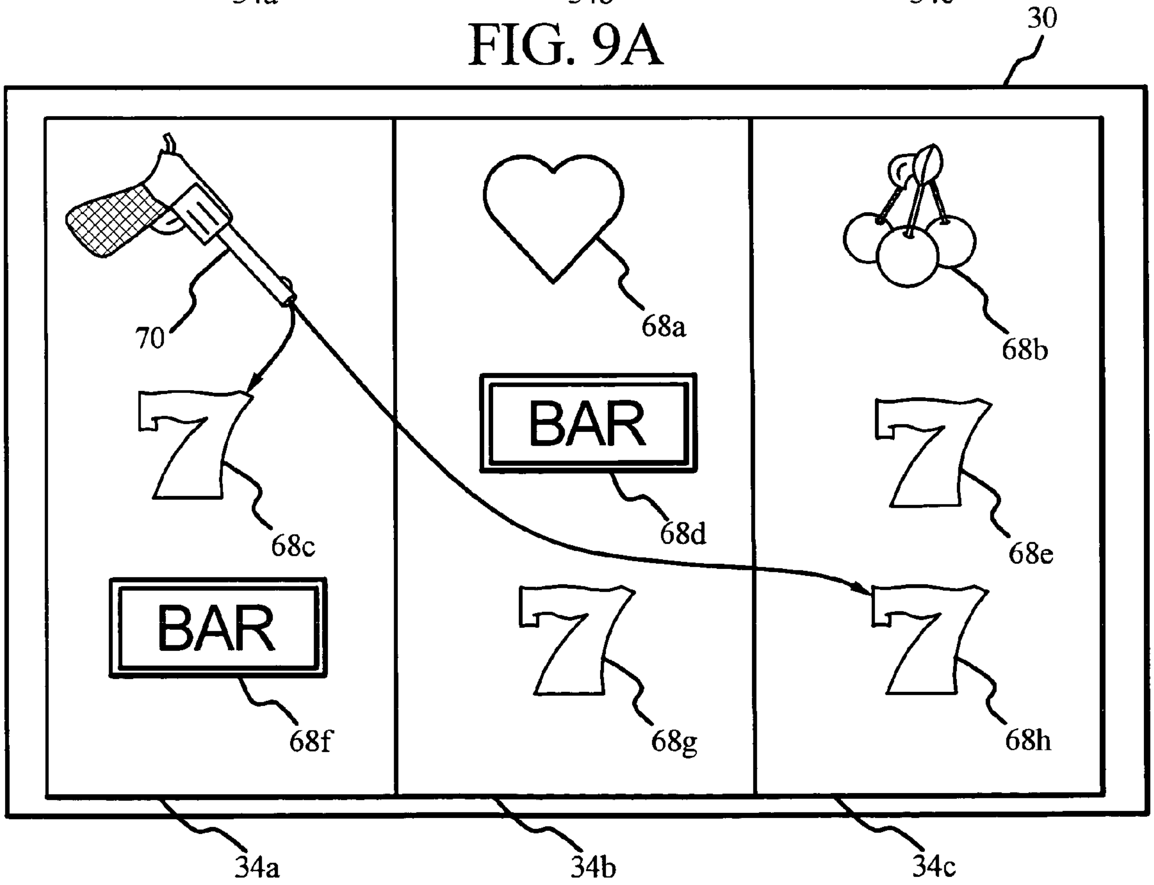
FIGS. 9A and 9B are front elevation views of a display device in which an activator symbol is displayed on a set of reels and symbols are transformed into functional symbols simultaneously.
Figure 9B:
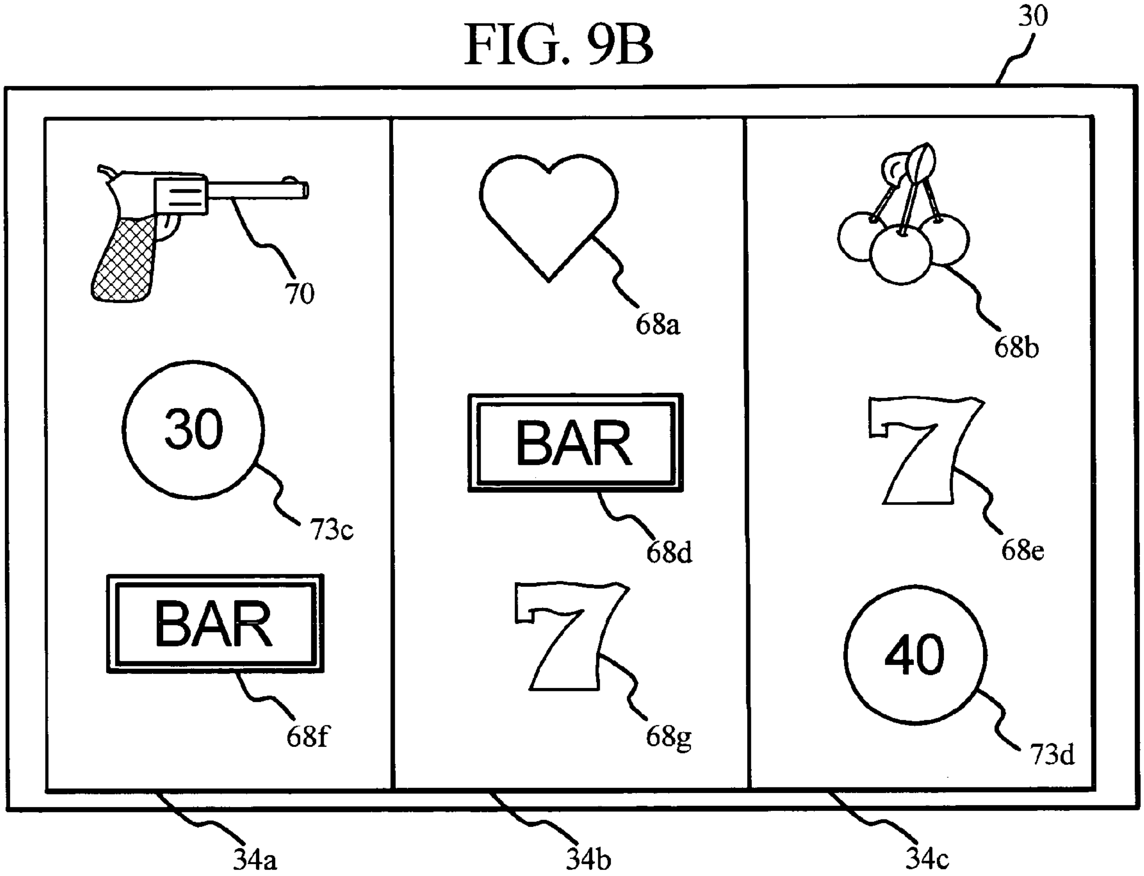

In one embodiment, the processor evaluates the transformation probability of each of the symbols displayed within a display device and transforms certain symbols, if any, into other functional symbols, such as credit values which a player receives. For example, in FIG. 8A, a display device displays a plurality of reels including a plurality of symbols. An activator symbol 70 is displayed in the top position of the first reel 34*a*. The processor determines the transformation probability of each symbol displayed within the display device. The processor then randomly determines that symbol 68*c* will be transformed into a credit value 73*a*, as shown in FIGS. 8B and 8C, based on the transformation probability of that symbol. If the processor transforms symbols into credit values successively, the symbol 68*c* that was transformed into a credit value may transform back into its original state and a second symbol 68*h* may be randomly determined to be transformed into a credit value 73*b* based on the transformation probability of that symbol, as shown in FIGS. 8D and 8E. If the symbols are transformed into credit values simultaneously, the processor transforms those symbols as shown in FIGS. 9A and 9B. In one embodiment, the credit values are randomly selected by the processor. In an alternative embodiment, the symbols when transformed into functional symbols provide additional primary games to the player. In another embodiment, the symbols when transformed into functional symbols become bonus trigger symbols which trigger bonus games in the gaming device.

Figure 10A:
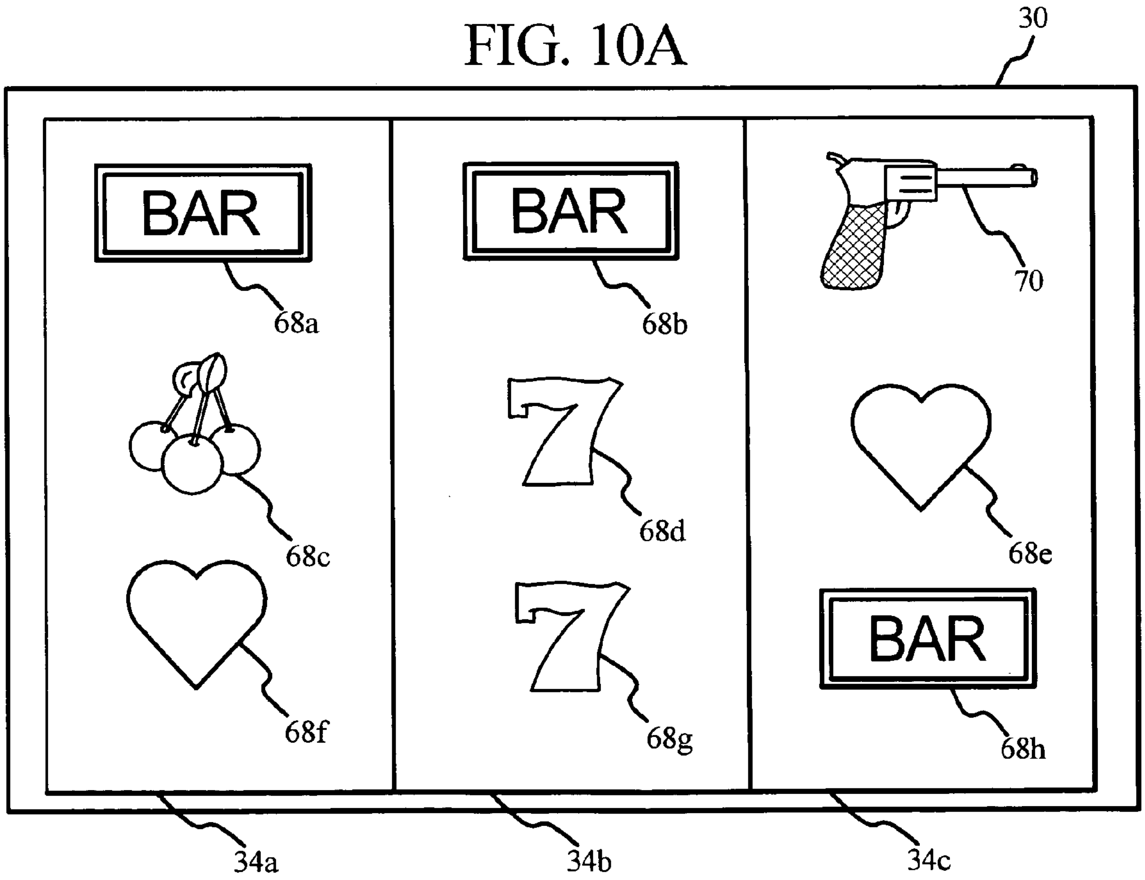
FIGS. 10A, 10B and 10C are front elevation views of a display device in which an activator symbol is displayed on a set of reels.
Figure 10B:
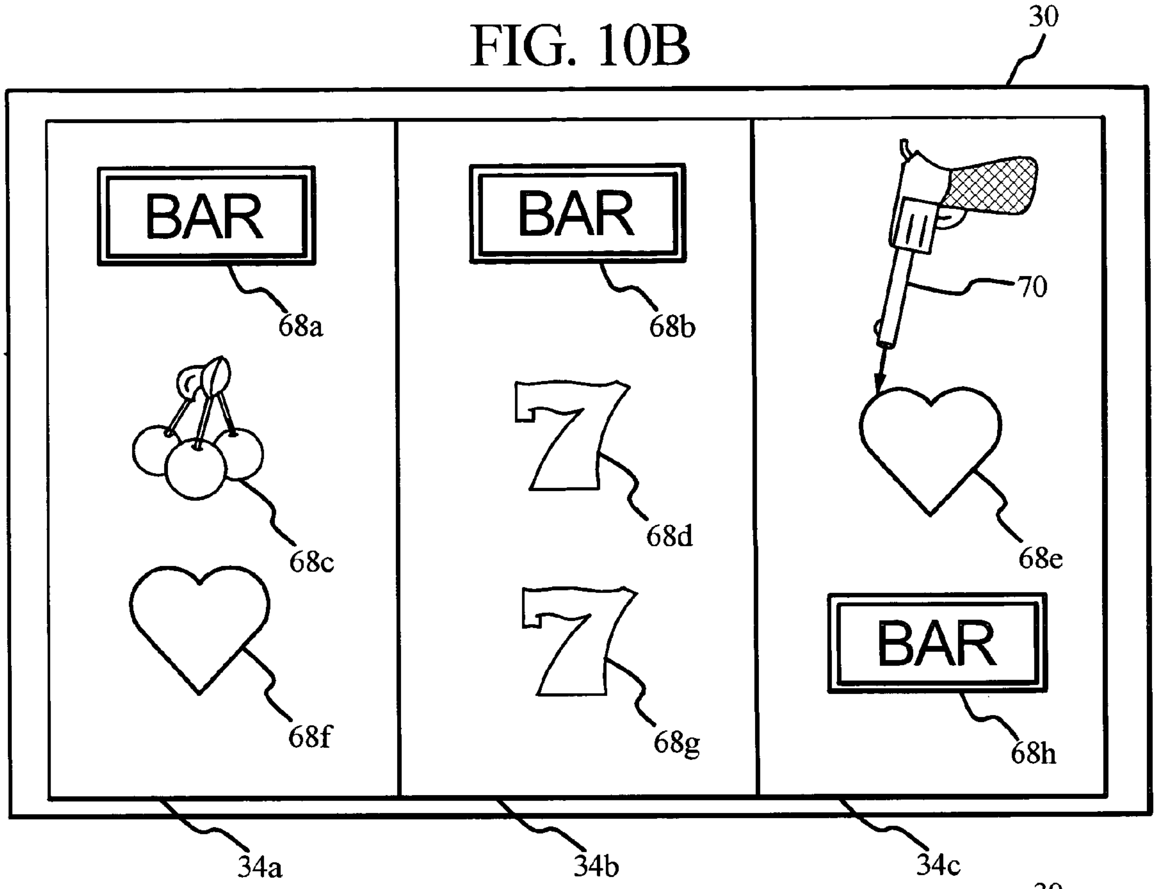
Figure 10C:
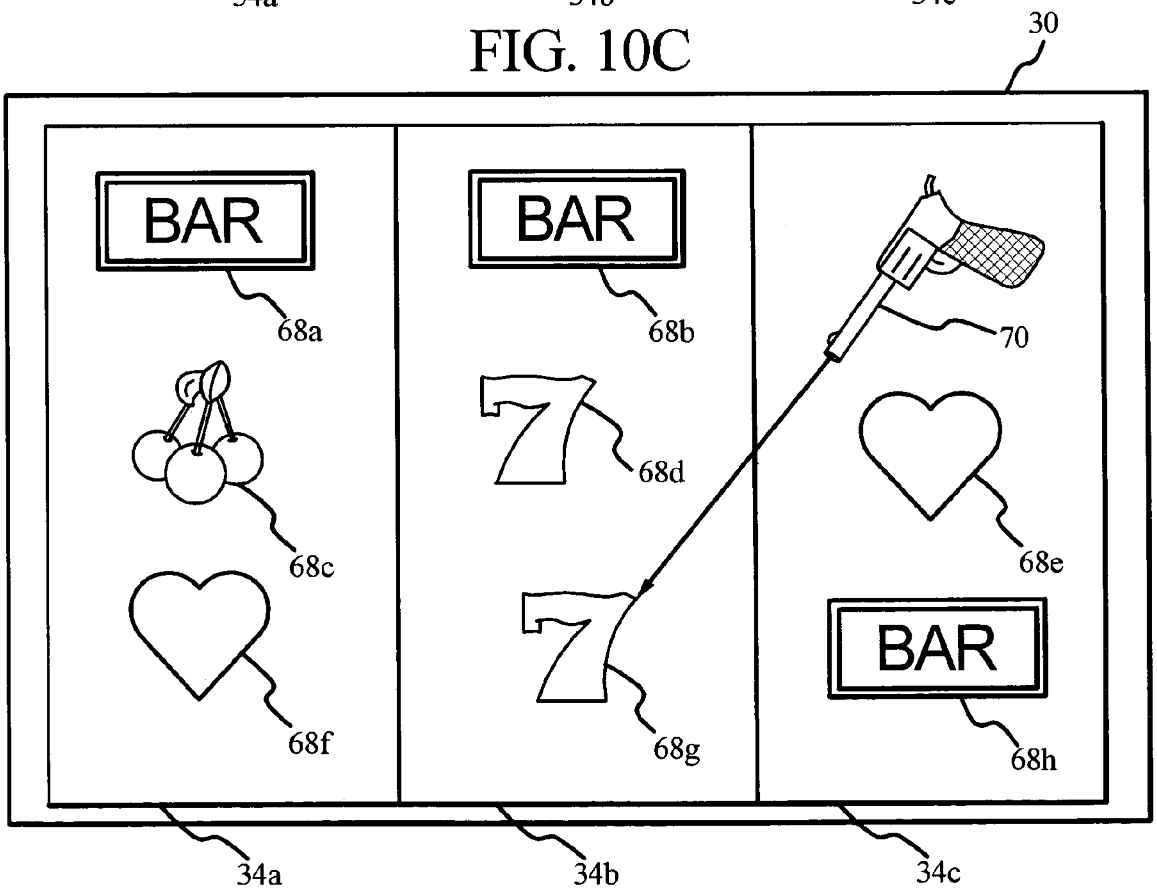

In an alternative embodiment, a transformation probability is associated with the activator symbol and is used by the processor to randomly determine which, if any, symbols within the display device will be transformed into wild symbols or other functional symbols. For example, in FIG. 10A, a display device displays a plurality of symbols 68*a* through 68*h* on a plurality of reels and also displays an activator symbol 70 in the top position of the third reel 34*c*. The processor determines the transformation probability of the activator symbol. In one embodiment, the processor accesses the transformation probability of the activator symbol from a table stored within a memory device which is in communication with the processor. The transformation probability of the activator symbol is used for each of the displayed symbols. For example, the processor randomly determines a symbol 68*e* to be a wild symbol based on the transformation probability of the activator symbol and transforms the symbol into a wild symbol, as shown in FIG. 10B. The processor then randomly determines a symbol 68*g* to be a wild symbol based on the transformation probability of the activator symbol and transforms the symbol into a wild symbol as shown in FIG. 10C. In an alternative embodiment, each symbol when transforming into a functional symbol becomes a credit value.

Figure 11A:
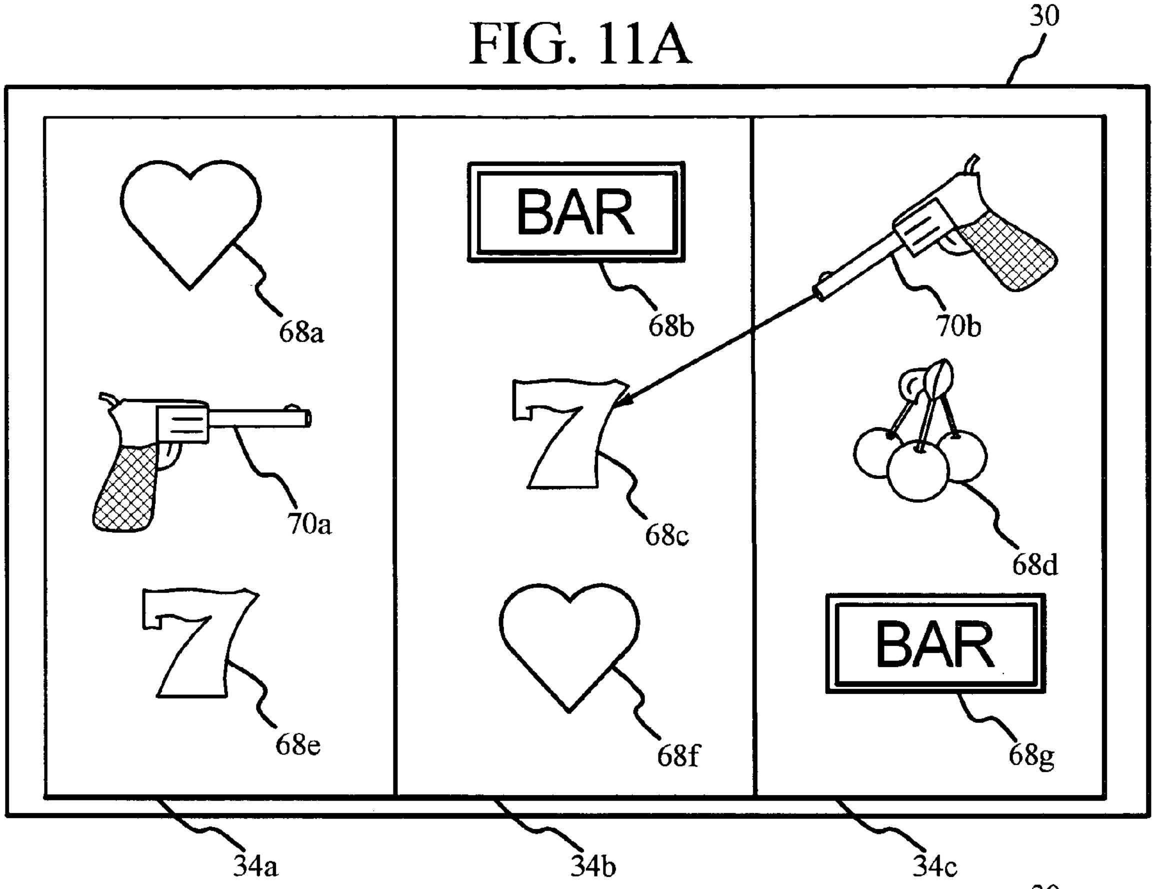
FIGS. 11A, 11B and 11C are front elevation views of a display device in which a plurality of activator symbols are displayed on a set of reels.
Figure 11B:
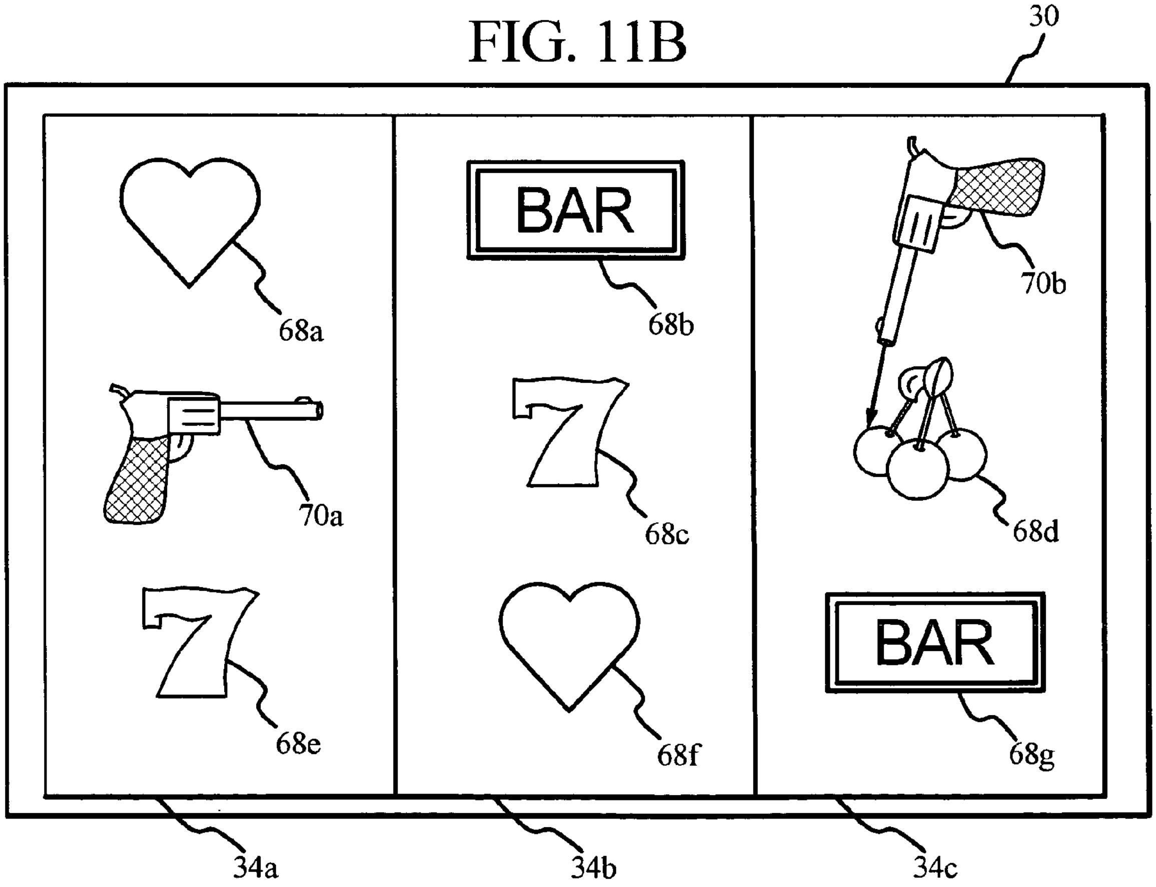
Figure 11C:
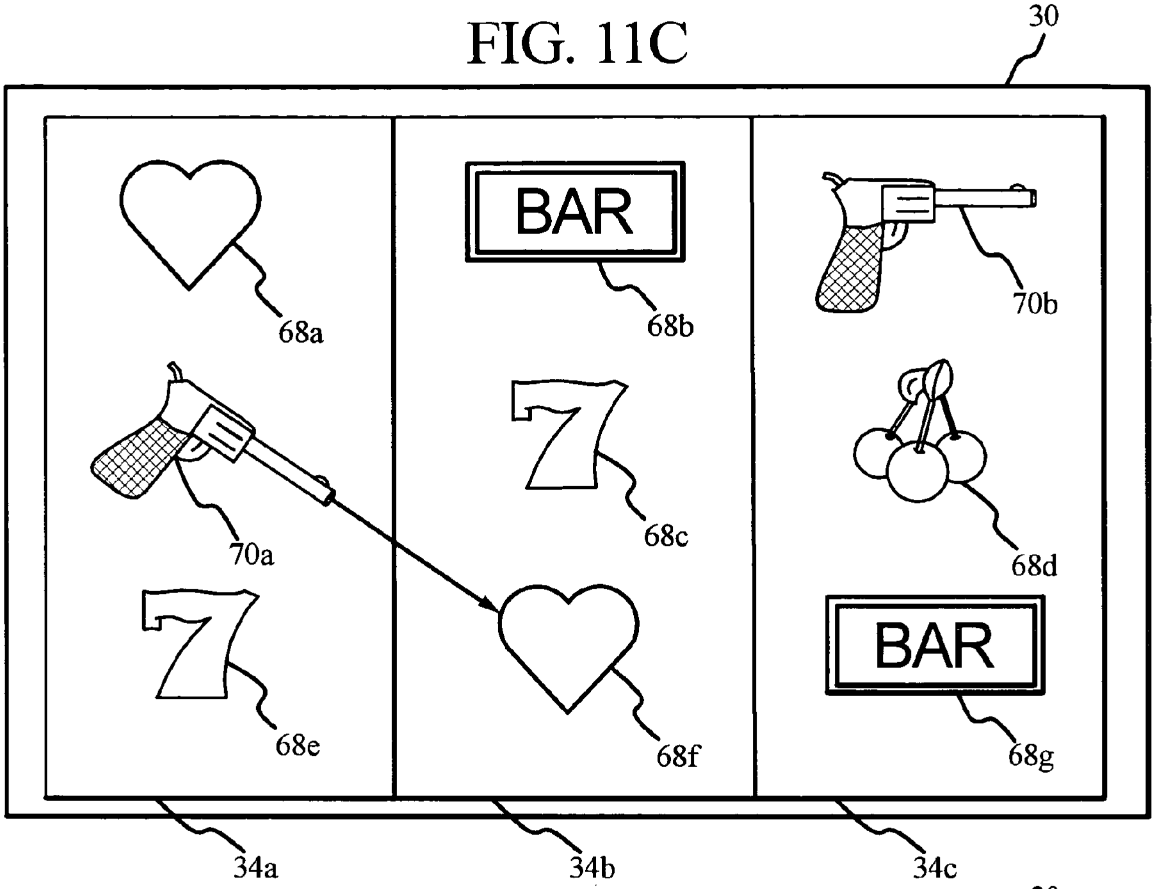

In one embodiment, a plurality of activator symbols are on the reels and may be present within the display device upon a random generation of said reels. When this occurs, the processor determines the transformation probability of each of the symbols displayed within the display device with respect to each of the plurality of activator symbols. The processor then randomly determines which, if any, symbols will be transformed into functional symbols such as wild symbols based on the transformation probability of each of the symbols. This may be performed by a plurality of methods. For example, a first activator symbol 70*b*, such as that displayed in the top position of the third reel 34*c*, as shown in FIG. 11A, may cause the processor to randomly determine a symbol 68*c* in the middle position of the second reel 34*b* is a wild symbol based on the transformation probability of the symbol and transform that symbol into a wild symbol. After the symbol has been transformed into a wild symbol, and the evaluation of any winning outcomes has been performed, the processor then randomly determines a second symbol 68*g* in the bottom position of the third reel 34*c* to be wild based on the transformation probability of that symbol. The processor transforms that symbol into a wild symbol, as shown in FIG. 11B. The transformation is performed in association with the activator symbol 70*b* present in the top position of the third reel. When all of the transformations associated with the activator symbol in the top position of the third reel have been performed, the transformations in association with the second activator symbol 70*a* may occur, as shown in FIG. 11C.

In an alternative embodiment, multiple activators displayed on the reels changes, such as by increasing, the transformation probability associated with one or more of the activators or symbols.

Figure 12A:
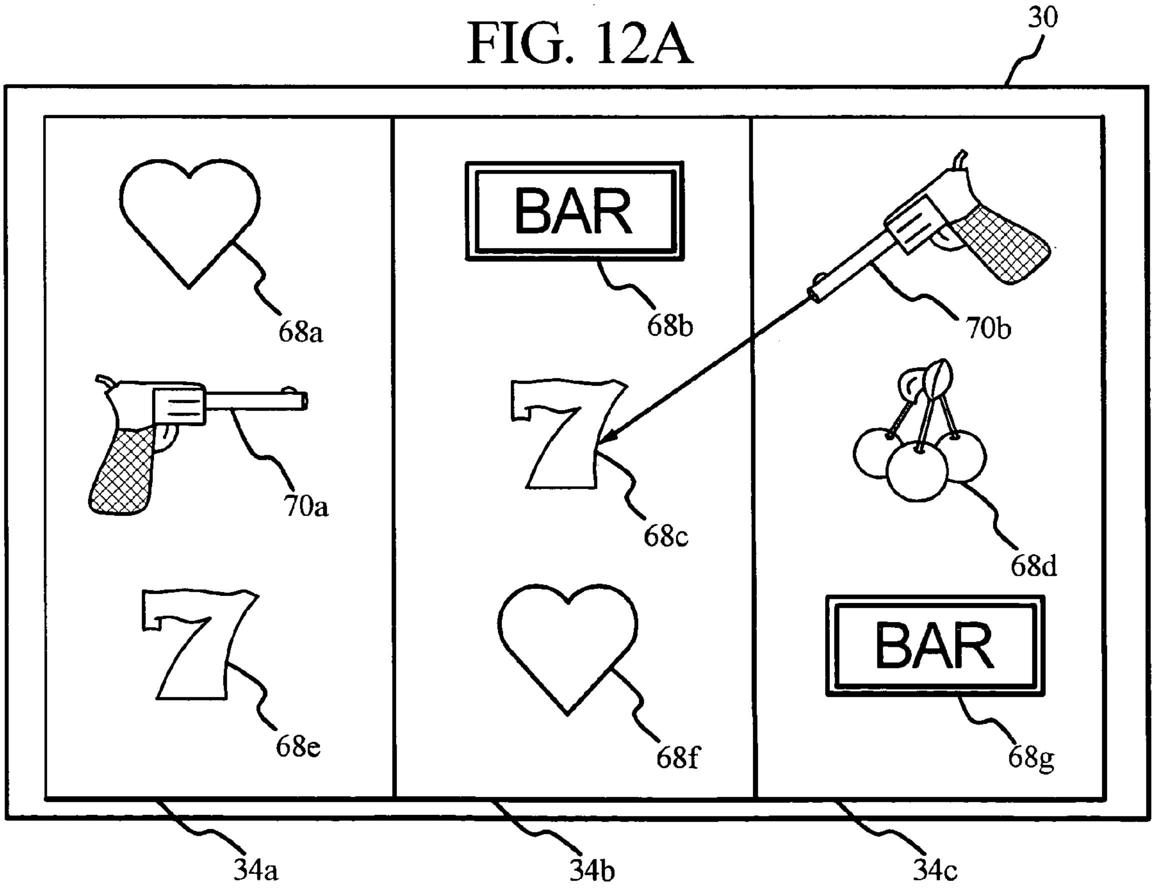
FIGS. 12A, 12B and 12C are front elevation views of a display device in which a plurality of activator symbols are displayed on a set of reels.
Figure 12B:
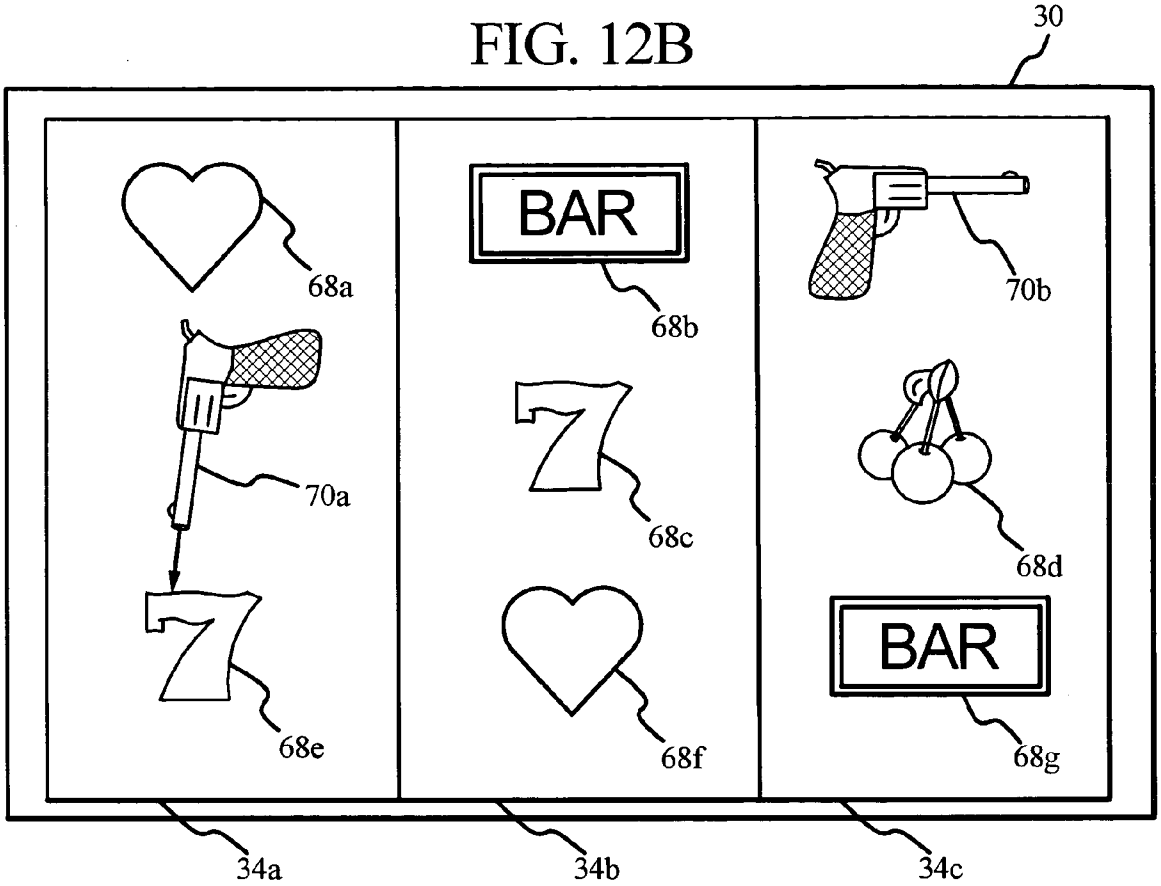
Figure 12C:
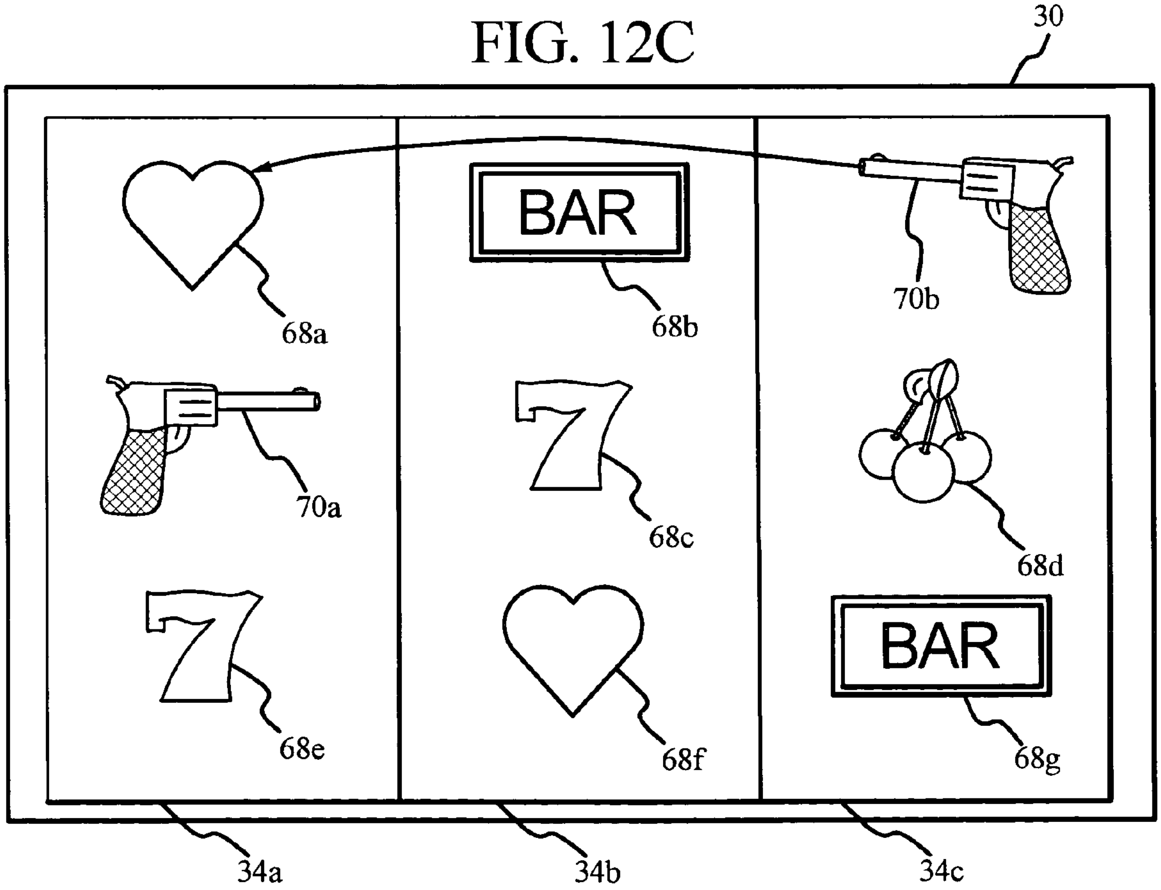

In one embodiment, the transformations associated with a plurality of activator symbols may be performed alternatively with respect to the activator symbols and successively with respect to the symbols. For example, a display device displays a plurality of reels including a plurality of symbols and also displays an activator symbol in the middle position of the first reel 34*a* as shown in FIG. 12A. The display device also displays an activator symbol 70*b* in the top position of the third reel 34*c*. The processor may first randomly determine a symbol 68*c* to be a wild symbol based on the transformation probability associated with that symbol and transform that symbol into a wild symbol 70*b* in association with the activator symbol 70*b* in the top position of the third reel. The processor then randomly determines a symbol 68*e* to be a wild symbol based on the transformation probability of that symbol and transforms that symbol into a wild symbol in association with the activator symbol 70*a* on the first reel 34*a*, as shown in FIG. 12B. Next, the processor randomly determines a symbol 68*a* to be a wild symbol based on the transformation probability of that symbol and transforms the symbol into a wild symbol in association with the activator symbol 70*b* on the third reel, as shown in FIG. 12C.

Figure 13A:
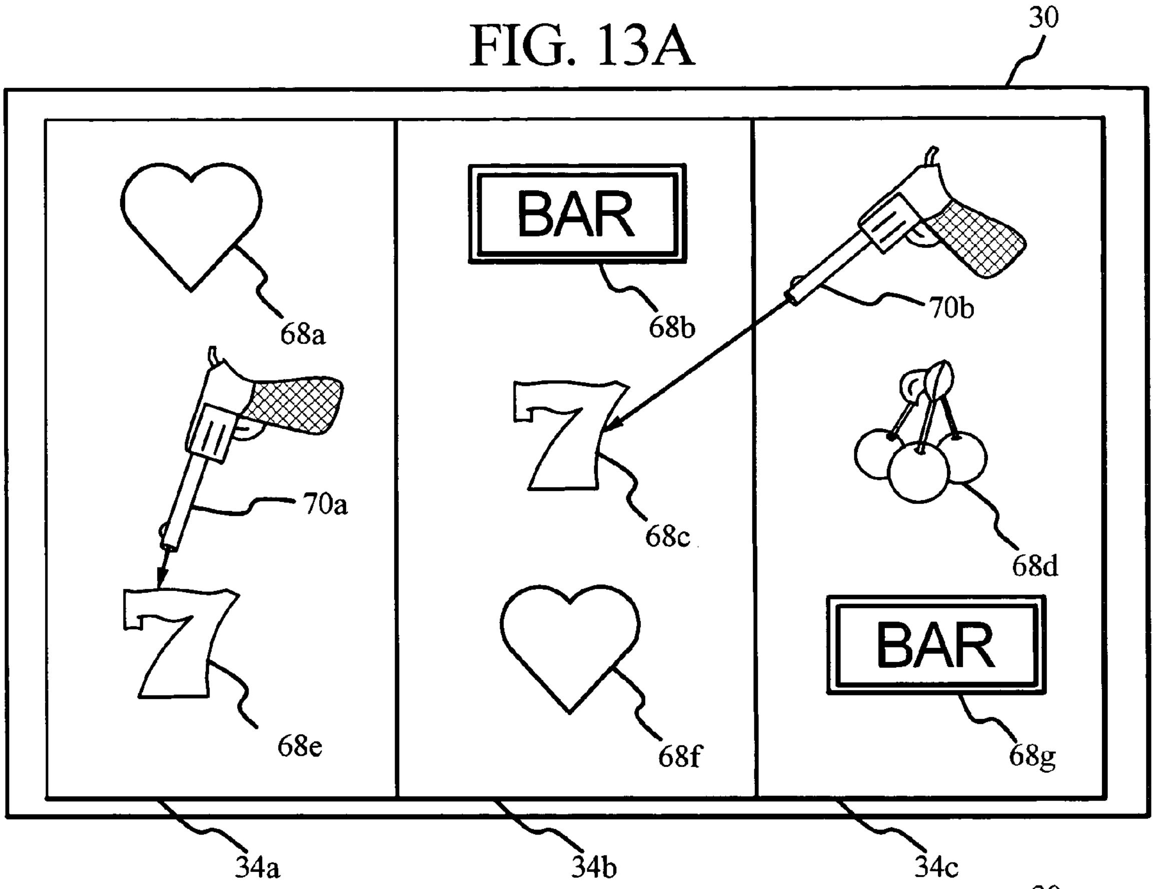
FIGS. 13A and 13B are front elevation views of a display device in which a plurality of activator symbols are displayed on a set of reels.
Figure 13B:
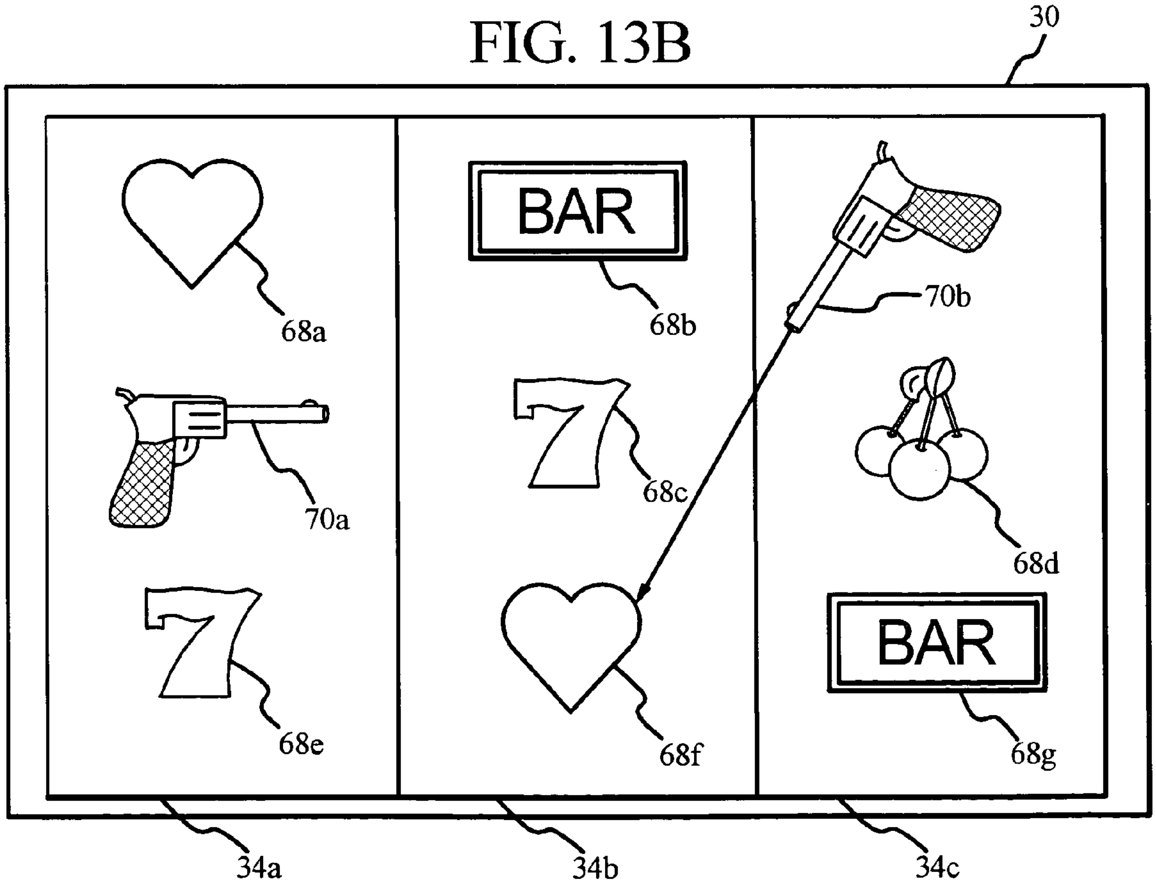

In one embodiment, when a plurality of activator symbols are displayed on the reels, the processor transforms symbols into functional symbols simultaneously with respect to the activator symbols, but successively with respect to the symbols. For example, in FIG. 13A, a display device displays a set of reels having a set of symbols and also displays an activator symbol 70*a* in the middle position of the first reel 34*a* and an activator symbol 70*b* in the top position of the third reel 34*c*. The processor randomly determines a symbol 68*c* to be a wild symbol based on the transformation probability of that symbol in association with the activator symbol 70*b* on the third reel 34*c*. The processor also randomly determines a symbol 68*e* to be a wild symbol, based on the transformation probability of that symbol, in association with the activator symbol 70*a* on the first reel 34*a*. The processor then simultaneously transforms symbols 68*c* and 68*e* into wild symbols. When evaluations are performed as to any winning outcomes, the processor randomly determines a symbol 68*f* to be a wild symbol based on the transformation probability of that symbol in association with the activator symbol 70*b* on the third reel. The processor also randomly determines a symbol 68*b* to be a wild symbol based on the transformation probability of that symbol in association with the activator symbol 70*a* on the first reel. The processor then simultaneously transforms symbols 68*f* and 68*b* into wild symbols as shown in FIG. 13B. In one alternative embodiment, the symbols are designated for transformation, but are only transformed if the activator meets a condition for transformation. For instance, one activator 70*a* could shoot another activator 70*b* such that only the symbols designated by activator 70*a* are transformed. Such determination could be randomly determined by the processor.

Figure 14:
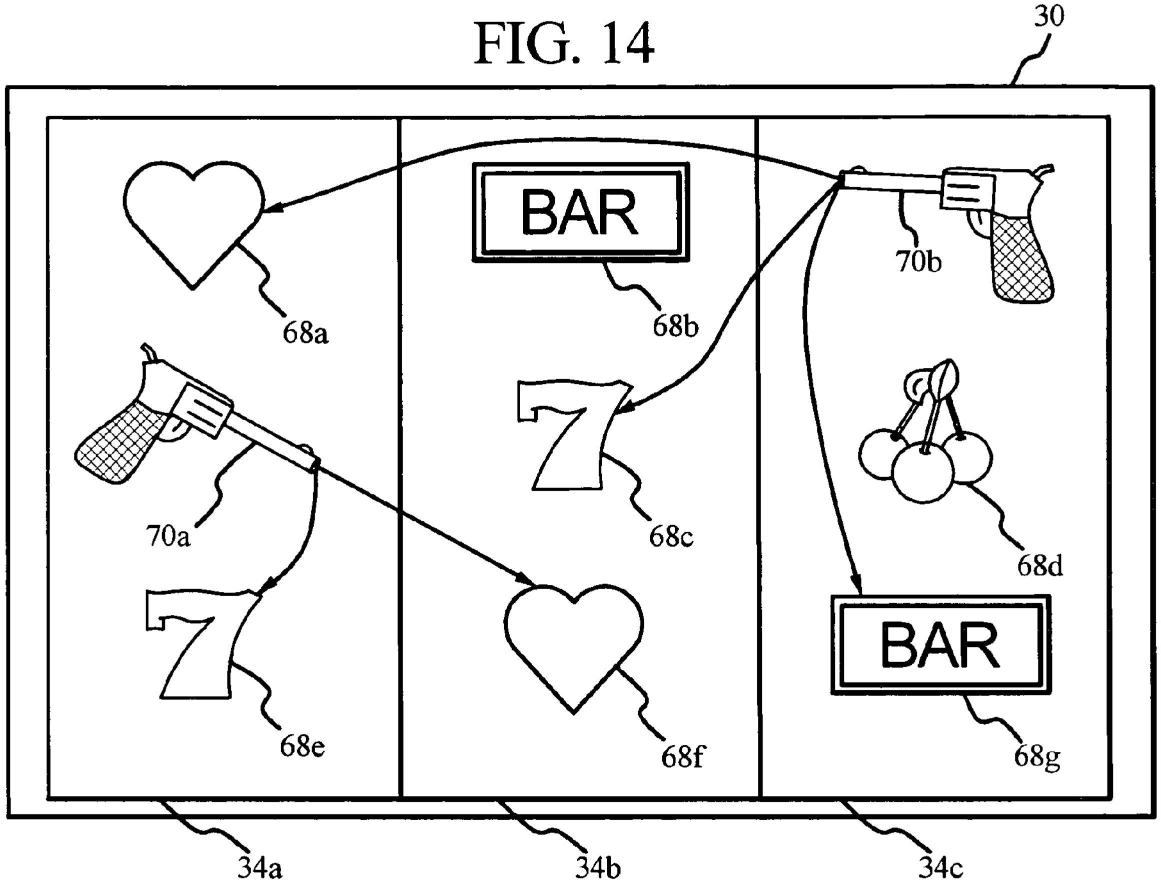
FIG. 14 is a front elevation view of a display device in which a plurality of activator symbols are displayed on a set of reels.

In one embodiment, the processor transforms symbols into functional symbols simultaneously with respect to the symbols and with respect to the activator symbols. For example, in FIG. 14, an activator symbol 70*a* is displayed in the middle position of the first reel 34*a* and a second activator symbol 70*b* is displayed in the top position of the third reel 34*c*. The processor randomly determines a plurality of symbols to be wild symbols, based on the transformation probabilities associated with those symbols and transforms those symbols into wild symbols with respect to each of the activator symbols. For example, the processor randomly determines symbols 68*e* and 68*f* to be wild symbols in association with activator symbol 70*a* and simultaneously determines symbols 68*a*, 68*c* and 68*g* to be wild symbols in association with activator symbol 70*b*.

In one embodiment, a plurality of activator symbols having transformation probabilities is displayed within the display device. When this occurs, the processor determines the transformation probabilities of each of the activator symbols and uses the transformation probabilities to randomly determine which, if any, of the symbols within the display device are transformed into functional symbols. The processor may transform the symbols either simultaneously or successively. The processor may transform a symbol based on the transformation probability of a first activator symbol within the plurality of activator symbols displayed and re-transform the symbol based on the transformation probability of a second activator symbol.

Figure 15:
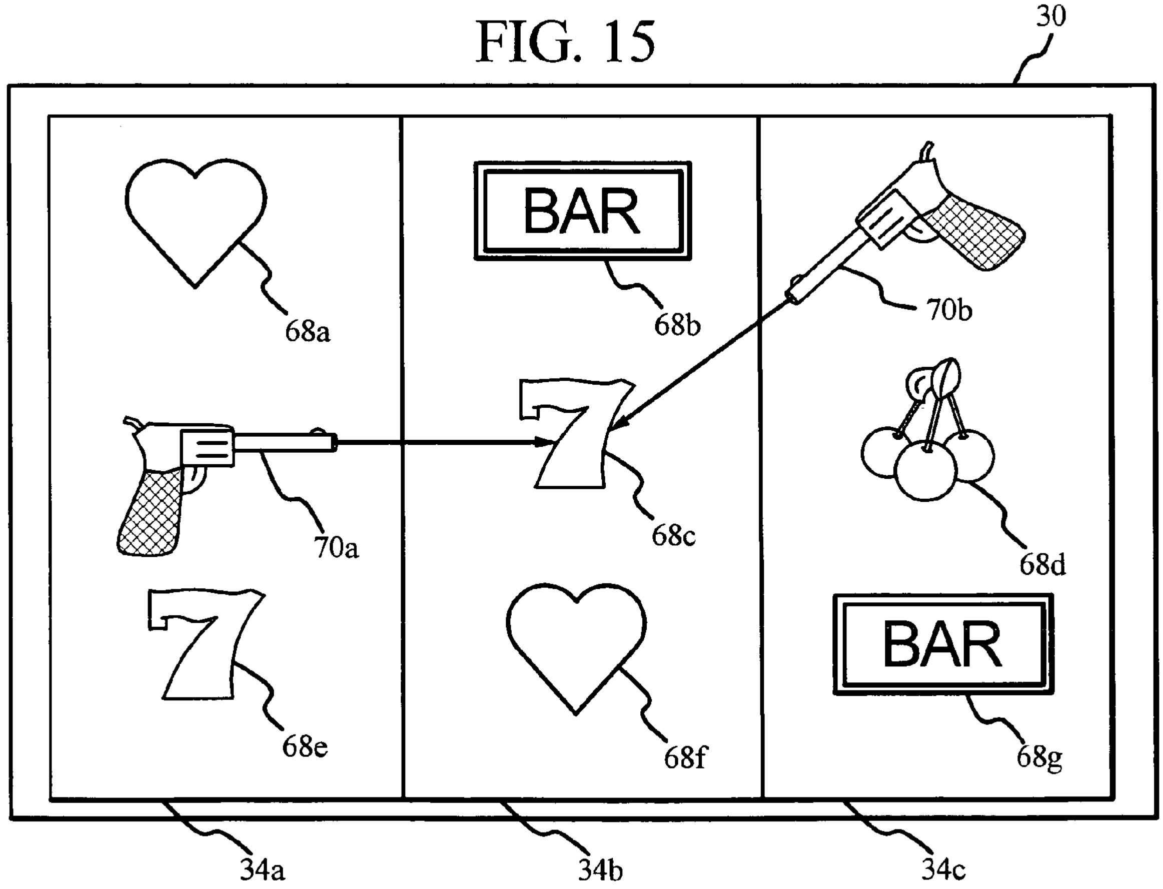
FIG. 15 is a front elevation view of a display device in which a plurality of activator symbols are displayed on a set of reels.

It should be appreciated that when a plurality of activator symbols are displayed on a display device, the processor may randomly determine a symbol to be transformed into a wild symbol or other functional symbol with respect to one or more of the activator symbols. FIG. 15 provides an example in which a symbol 68*c* in the middle position of the second reel 34*b* is randomly determined to be a wild symbol, based on the transformation probability of the symbol 68*b*, in association with both the activator symbol 70*a* on the first reel and the activator symbol 70*b* on the third reel. When this occurs, in one embodiment, any payout is modified by a modifier such as a multiplier. The multiplier may be randomly determined or predetermined. In an alternative embodiment, when this occurs, the symbol turns into a credit value. The symbol could turn into any other award such as a bonus game or one or more free games.

It should be appreciated that the transformation probability may be different for each symbol on the reels and that the probability for a given symbol may vary during the course of the processor transforming other symbols. For example, a reel may include heart symbols, "7" symbols and BAR symbols. The heart symbols may have a higher transformation probability than the "7" symbols or the BAR symbols. In one embodiment, each of the symbols in a type of symbols may have a different transformation probability.

In a further embodiment of the present invention, the transformation probabilities may be associated with one or more locations on the display device. The locations may have the same probabilities or different probabilities. In this embodiment, it should be appreciated that the probabilities are accordingly not directly associated with the activators or the symbols. In a further alternative embodiment, the transformation probabilities may be randomly determined from a potential range of probabilities, could be selected from one or more pools or tables of probabilities or determined in any other suitable manner in conjunction with the game math.

In another embodiment of the present invention, certain activators are associated with certain symbols or groups of symbols, wherein the activators only activate certain symbols or groups of symbols. It should also be appreciated that the transformation probabilities may be associated with groups of symbols, and that different groups of symbols or locations could have different transformation probabilities.

A further embodiment of the present invention includes two or more activators which simultaneously determine which symbols are functional (or wild) with respect to each activator. In one embodiment, all of the determined symbols are transformed. In another embodiment, only one activator cause its corresponding determined symbols to be transformed for the player. The determination of which activator is chosen may be randomly or otherwise suitably determined. For instance, the symbols transformed may be related to the activator symbol with more or less transformed symbols than the other activator.

In a further alternative embodiment, a symbol, once transformed could remain wild for one or more other transformations. In another alternative embodiment, several, but not all symbols could be transformed simultaneously. In another alternative embodiment, only symbols in certain locations such as in certain rows may be transformed.

In an alternative embodiment of the present invention, the transformation probability associated with the activator may decrease as the processor transforms the symbols. In a further alternative embodiment, the transformation probability associated with the activator may increase as the processor transforms the symbols. In a further alternative embodiment, the transformation probability associated with the activator increases to a percentage greater than zero and less than one after the activator does not transform one or more of the symbols.

In a further alternative embodiment, the activator may move after an evaluation of a symbol. For instance, the activator may move to the location of an evaluated symbol after that symbol is transformed or if the symbol is not transformed, at any time after the determination is made for that symbol. The activator may also continue to move until the activator reaches all of the locations of the symbols or reaches a terminating condition. In one embodiment, the terminating condition is the terminating symbol, a previously transformed symbol or a boundary such as a row or column. It should also be appreciated that one or more of the activators could be associated with certain symbols or locations.

Although the foregoing embodiments spoke in terms of a transformation probability related to one or more symbols, one or more activators, one or more locations, and a number of previously transformed symbols, it should be appreciated that the effective transformation probability could be a result of combining two or more of these factors in any mathematically acceptable way.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming device operable under control of a processor, said gaming device comprising:

a display device controlled by the processor;

a plurality of symbols displayable by the display device, wherein said plurality of symbols includes a designated group of symbols including a plurality of designated symbols;

a transformation probability associated with the designated group of symbols, wherein said transformation probability is associated with said designated group of symbols regardless of the positions at which the symbols of said designated group of symbols are displayed by the display device; and at least one activator symbol, wherein the processor is operable with the display device to:

(a) display a plurality of symbols;

(b) determine if the activator symbol is displayed;

(c) if the activator symbol is displayed and at least one of the designated symbols is displayed, determine if the displayed designated symbols of said designated group of symbols are transformed into functional symbols; and (d) if said designated symbols are determined to be transformed into functional symbols, transform the displayed designated symbols into functional symbols prior to an evaluation of the symbols for determining any awards.

2. The gaming device of claim 1, wherein the determination if the displayed designated symbols of the designated group of symbols are transformed into functional symbols is based on the transformation probability associated with said designated group of symbols.

3. The gaming device of claim 1, wherein if said designated symbols are determined to be transformed into functional symbols, the processor is operable with the display device to simultaneously transform the displayed designated symbols into functional symbols prior to an evaluation of the symbols for determining any awards.

4. The gaming device of claim 1, which includes a plurality of designated groups of symbols, wherein each designated group of symbols includes a plurality of designated symbols.

5. The gaming device of claim 4, wherein each of the designated groups of symbols include a plurality of the same symbols.

6. The gaming device of claim 4, wherein each of the designated groups of symbols are defined by a characteristic of each of the symbols.

7. The gaming device of claim 4, wherein each of the designated groups of symbols are defined by a symbol type.

8. The gaming device of claim 4, which includes a plurality of transformation probabilities, wherein said transformation probabilities are each associated with at least one of the designated groups of symbols, wherein each said transformation probability is associated with its designated group of symbols regardless of the position at which the designated symbols of said designated group of symbols are displayed by the display device.

9. The gaming device of claim 8, wherein the transformation probability associated with a first designated group of symbols is higher than the transformation probability associated with a second designated group of symbols.

10. The gaming device of claim 1, wherein the designated group of symbols includes a plurality of the same symbols.

11. The gaming device of claim 1, wherein the designated group of symbols is defined by a characteristic of each of the symbols.

12. The gaming device of claim 1, wherein the designated group of symbols is defined by a symbol type.

13. The gaming device of claim 1, wherein at least one of the functional symbols is selected from the group consisting of: a wild symbol, a credit value, a free primary game symbol, and a bonus trigger symbol.

14. The gaming device of claim 1, which includes a plurality of activator symbols.

15. A gaming device operable under control of a processor, said gaming device comprising:

a display device controlled by the processor;

a plurality of symbols including a designated group of symbols including a plurality of designated symbols;

at least one activator symbol; and a transformation probability associated with each said activator symbol, wherein for each said activator symbol said transformation probability is associated with said activator symbol regardless of the position at which said activator symbol is displayed, and wherein upon a triggering event including said activator symbol being displayed by the display device, the processor is operable with the display device to determine if at least one of the designated symbols is displayed and determine if the displayed designated symbols of said designated group of symbols are transformed into functional symbols based on the transformation probability associated with said activator symbol and display any transformation determined to occur prior to an evaluation of the symbols for determining any awards.

16. The gaming device of claim 15, wherein if at least one of the designated symbols of said designated group of symbols is determined to be transformed into functional symbols based on the transformation probability associated with said activator symbol, said processor is operable with the display device to simultaneously display any transformation determined to occur prior to an evaluation of the symbols for determining any awards.

17. The gaming device of claim 15, wherein at least one of the functional symbols is selected from the group consisting of: a wild symbol, a credit value, a free primary game symbol, and a bonus trigger symbol.

18. The gaming device of claim 15, which includes a plurality of activator symbols and a separate transformation probability associated with each activator symbol.

19. The gaming device of claim 15, which includes a plurality of designated groups of symbols, wherein each designated group of symbols includes a plurality of designated symbols.

20. The gaming device of claim 19, wherein each designated group of symbols includes a plurality of the same symbols.

21. The gaming device of claim 19, wherein each designated group of symbols is defined by a characteristic of each of the symbols.

22. The gaming device of claim 19, wherein each designated group of symbols is defined by a symbol type.

23. The gaming device of claim 15, wherein the designated group of symbols includes a plurality of the same symbols.

24. The gaming device of claim 15, wherein the designated group of symbols is defined by a characteristic of each of the symbols.

25. The gaming device of claim 15, wherein the designated group of symbols is defined by a symbol type.

26. A gaming device operated under control of a processor, said gaming device comprising:

a plurality of symbols;

a transformation probability greater than zero percent and less than one hundred percent which is associated with a designated one of the plurality of symbols; and a display device controlled by the processor and operable to display said symbols, wherein said processor and said display device are operable to:

(a) display a plurality of the symbols;

(b) after the display of the designated symbol associated with the transformation probability, determine whether said designated symbol will be transformed into a functional symbol based on the transformation probability associated with said designated symbol, wherein said transformation probability is associated with said designated symbol regardless of the position at which said designated symbol is displayed by the display device; and (c) display any said transformation determined to occur.

27. The gaming device of claim 26, wherein when an activator symbol is displayed, the transformation probability greater than zero percent and less than one hundred percent is associated with the designated one of the plurality of symbols.

28. The gaming device of claim 26, wherein a plurality of transformation probabilities are associated with a plurality of designated symbols.

29. The gaming device of claim 28, wherein the transformation probability for a first one of the plurality of designated symbols is higher than the transformation probability for a second one of the plurality of designated symbols.

30. The gaming device of claim 28, which includes a plurality of different types of designated symbols in the plurality of symbols, wherein a first type of designated symbol has a higher transformation probability than the transformation probability of a second type of designated symbol.

31. The gaming device of claim 26, wherein at least one of the functional symbols is selected from the group consisting of: a wild symbol, a credit value, a free primary game symbol, and a bonus trigger symbol.

32. The gaming device of claim 26, which includes a plurality of groups of symbols in the plurality of symbols, wherein a first group of the symbols has a higher transformation probability than a transformation probability of a second group of the symbols.

33. The gaming device of claim 26, wherein said symbol is transformed into one of a credit value and a multiplier.

34. The gaming device of claim 26, wherein the processor transforms less than all of the symbols to be transformed based on a random event controlled by the processor.

35. The gaming device of claim 34, wherein the random event includes an interaction between a plurality of activator symbols.

36. A gaming device operated under control of at least one processor, said gaming device comprising:

a plurality of symbols, including a plurality of designated symbols and at least one activator symbol;

a display device in communication with the at least one processor and configured to display said symbols, wherein said processor is further configured to:

(a) cause the display device to display a plurality of said symbols;

(b) determine if at least one of the designated symbols and at least one of the activator symbols are simultaneously displayed by the display device;

(c) if at least one of the designated symbols and at least one of the activator symbols are simultaneously displayed by the display device, cause the simultaneous transformation of each of the displayed designated symbols into a functional symbol regardless of what positions said designated symbols are in; and (d) evaluate the displayed symbols, including any functional symbols, and determine an outcome.

37. The gaming device of claim 36, wherein at least one of the functional symbols is selected from the group consisting of: a wild symbol, a credit value, a free primary game symbol, and a bonus trigger symbol.

38. The gaming device of claim 36, which includes a plurality of groups of designated symbols in the plurality of symbols.

39. The gaming device of claim 36, wherein the designated symbols are defined by a symbol type.

40. The gaming device of claim 36, wherein the designated symbols include a plurality of the same symbols.

41. The gaming device of claim 36, wherein the designated symbols are defined by a characteristic of each of the symbols.

42. A method of operating a gaming device, said gaming device including a plurality of symbols including a designated group of symbols including a plurality of designated symbols, a transformation probability associated with the designated group of symbols, wherein said transformation probability is associated with said designated group of symbols regardless of the positions at which the designated symbols are displayed, and at least one activator symbol, said method comprising:

(a) displaying a plurality of symbols;

(b) if the activator symbol is displayed and at least one of the designated symbols is displayed, determining if the displayed designated symbols of said designated group of symbols are transformed into functional symbols; and (c) if said designated symbols are determined to be transformed into functional symbols, transforming the displayed designated symbols into functional symbols prior to an evaluation of the symbols for determining any awards.

43. The method claim 42, wherein the determination if the displayed designated symbols of the designated group of symbols are transformed into functional symbols is based on the transformation probability associated with said designated group of symbols.

44. The method claim 42, wherein if said designated symbols are determined to be transformed into functional symbols, the processor is operable with the display device to simultaneously transform the displayed designated symbols into functional symbols prior to an evaluation of the symbols for determining any awards.

45. The method claim 42, which includes a plurality of designated groups of symbols, wherein each designated group of symbols includes a plurality of designated symbols.

46. The method of claim 45, wherein each of the designated groups of symbols include a plurality of the same symbols.

47. The method of claim 45, wherein each of the designated groups of symbols are defined by a characteristic of each of the symbols.

48. The method of claim 45, wherein each of the designated groups of symbols are defined by a symbol type.

49. The method of claim 45, which includes a plurality of transformation probabilities, wherein said transformation probabilities are each associated with at least one of the designated groups of symbols, wherein each said transformation probability is associated with said designated group of symbols regardless of the position at which the designated symbols of said designated group of symbols are displayed.

50. The method of claim 45, wherein the transformation probability associated with a first designated group of symbols is higher than the transformation probability associated with a second designated group of symbols.

51. The method claim 42, wherein the designated group of symbols includes a plurality of the same symbols.

52. The method claim 42, wherein the designated group of symbols is defined by a characteristic of each of the symbols.

53. The method claim 42, wherein the designated group of symbols is defined by a symbol type.

54. The method claim 42, wherein at least one of the functional symbols is selected from the group consisting of: a wild symbol, a credit value, a free primary game symbol, and a bonus trigger symbol.

55. The method claim 42, which includes a plurality of activator symbols.

56. The method claim 42, which is provided through a data network.

57. The method of claim 56, wherein the data network is an internet.

58. A method of operating a gaming device, said gaming device including a plurality of symbols including a designated group of symbols including a plurality of designated symbols, at least one activator symbol, and a transformation probability associated with each said activator symbol, wherein for each said activator symbol said transformation probability is associated with said activator symbol regardless of the position at which said activator symbol is displayed, said method comprising:

(a) displaying a plurality of the symbols;

(b) upon a triggering event including said activator symbol being displayed, determining if the displayed designated symbols of said designated group of symbols are transformed into functional symbols based on the transformation probability associated with said activator symbol; and (c) prior to an evaluation of the symbols for determining any awards, displaying any transformation determined to occur.

59. The method of claim 58, wherein if at least one of the designated symbols of said designated group of symbols is determined to be transformed into functional symbols based on the transformation probability associated with said activator symbol, said processor is operable with the display device to simultaneously display any transformation determined to occur prior to an evaluation of the symbols for determining any awards.

60. The method of claim 58, wherein at least one of the functional symbols is selected from the group consisting of: a wild symbol, a credit value, a free primary game symbol, and a bonus trigger symbol.

61. The method of claim 58, wherein the transformation probability associated with the activator symbol varies in at least two different displays of the symbols.

62. The method of claim 58, which includes a plurality of activator symbols and a separate transformation probability associated with each activator symbol.

63. The method of claim 58, which includes a plurality of designated groups of symbols, wherein each designated group of symbols includes a plurality of designated symbols.

64. The method of claim 63, wherein each designated group of symbols includes a plurality of the same symbols.

65. The method of claim 63, wherein each designated group of symbols is defined by a characteristic of each of the symbols.

66. The method of claim 63, wherein each designated group of symbols is defined by a symbol type.

67. The method of claim 63, wherein the designated group of symbols includes a plurality of the same symbols.

68. The method of claim 58, wherein the designated group of symbols is defined by a characteristic of each of the symbols.

69. The method of claim 58, wherein the designated group of symbols is defined by a symbol type.

70. The method of claim 58, which is provided through a data network.

71. The method of claim 70, wherein the data network is an internet.

72. A method of operating a gaming device, said gaming device including a plurality of symbols and a transformation probability greater than zero percent and less than one hundred percent which is associated with a designated one of the plurality of symbols, said method comprising:

(a) displaying a plurality of the symbols, (b) upon the display of the designated symbol associated with the transformation probability, determining whether said designated symbol will be transformed into a functional symbol based on the transformation probability associated with said designated symbol, wherein said transformation probability is associated with said designated symbol regardless of the position at which said designated symbol is displayed; and (c) displaying any said transformation determined to occur.

73. The method of claim 72, wherein when an activator symbol is displayed, the transformation probability greater than zero percent and less than one hundred percent is associated with the designated one of the plurality of symbols.

74. The method of claim 72, wherein a plurality of transformation probabilities are associated with a designated plurality of the symbols.

75. The method of claim 74, wherein the transformation probability for a first one of the plurality of designated symbols is higher than the transformation probability for a second one of the plurality of designated symbols.

76. The method of claim 74, which includes a plurality of different types of symbols in the plurality of symbols, wherein a first type of designated symbol has a higher transformation probability than the transformation probability of a second type of designated symbol.

77. The method of claim 72 wherein at least one of the functional symbols is selected from the group consisting of: a wild symbol, a credit value, a free primary game symbol, and a bonus trigger symbol.

78. The method of claim 72, which includes a plurality of groups of designated symbols in the plurality of symbols, wherein a first group of the designated symbols has a higher transformation probability than a transformation probability of a second group of the designated symbols.

79. The method of claim 72, wherein said symbol is transformed into one of a credit value and a multiplier.

80. The method of claim 72, which is provided through a data network.

81. The method of claim 80, wherein the data network is an internet.

82. A method of operating a gaming device which includes a plurality of symbols, including a plurality of designated symbols and at least one activator symbol, said method comprising:

(a) displaying a plurality of said symbols;

(b) determining if at least one of the designated symbols and at least one of the activator symbols are simultaneously displayed;

(c) if at least one of the designated symbols and at least one of the activator symbols are simultaneously displayed, causing the simultaneous transformation of each of the displayed designated symbols into a functional symbol regardless of what positions said designated symbols are in; and (d) evaluating the displayed symbols, including any functional symbols, to determine an outcome.

83. The method of claim 82, wherein at least one of the functional symbols is selected from the group consisting of: a wild symbol, a credit value, a free primary game symbol, and a bonus trigger symbol.

84. The method of claim 82, which includes a plurality of groups of designated symbols in the plurality of symbols.

85. The method of claim 82, wherein the designated symbols are defined by a symbol type.

86. The method of claim 82, wherein the designated symbols include a plurality of the same symbols.

87. The method of claim 82, wherein the designated symbols are defined by a characteristic of each of the symbols.

88. The method of claim 82, which is provided through a data network.

89. The method of claim 88, wherein the data network is an internet.

* * * * *